(12) United States Patent
Grube et al.

(10) Patent No.: US 9,292,682 B2
(45) Date of Patent: *Mar. 22, 2016

(54) ACCESSING A SECOND WEB PAGE FROM A DISPERSED STORAGE NETWORK MEMORY BASED ON A FIRST WEB PAGE SELECTION

(75) Inventors: Gary W. Grube, Barrington Hills, IL (US); Timothy W. Markison, Mesa, AZ (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 872 days.

This patent is subject to a terminal disclaimer.

(21) Appl. No.: 13/450,034

(22) Filed: Apr. 18, 2012

(65) Prior Publication Data

US 2012/0290915 A1 Nov. 15, 2012

Related U.S. Application Data

(60) Provisional application No. 61/483,856, filed on May 9, 2011.

(51) Int. Cl.
| | | |
|---|---|---|
| *G06F 17/00* | (2006.01) | |
| *G06F 21/50* | (2013.01) | |
| *H04L 29/08* | (2006.01) | |
| *H04L 29/12* | (2006.01) | |
| *G06F 11/10* | (2006.01) | |
| *G06F 21/44* | (2013.01) | |

(Continued)

(52) U.S. Cl.
CPC ............ *G06F 21/50* (2013.01); *H04L 61/1511* (2013.01); *H04L 67/1097* (2013.01); *G06F 11/1076* (2013.01); *G06F 21/445* (2013.01); *G06F 21/51* (2013.01); *G06F 21/60* (2013.01); *G06F 21/604* (2013.01); *G06F 21/805* (2013.01); *G06F 21/82* (2013.01); *G06F 2211/1028* (2013.01)

(58) Field of Classification Search
CPC .................................................. G06F 17/30864
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Keith Bloomquist
(74) *Attorney, Agent, or Firm* — Garlick & Markison; Timothy W. Markison

(57) ABSTRACT

A method begins, when a second web page is selected based on an element of a first web page, with a dispersed storage (DS) processing module determining dispersed storage network (DSN) location information for the second web page. The method continues with the DS processing module interpreting the DSN location information to request retrieval of a plurality of sets of at least a decode threshold number of encoded data slices from a DSN. The method continues with the DS processing module decoding, using a DS error coding function, a set of the plurality of sets of the least the decode threshold number of encoded data slices to reproduce an element of the second web page.

10 Claims, 18 Drawing Sheets

(51) Int. Cl.
*G06F 21/51* (2013.01)
*G06F 21/60* (2013.01)
*G06F 21/80* (2013.01)
*G06F 21/82* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0220064 | A1* | 9/2007 | Najork ............... G06F 11/2028 |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0287200 | A1* | 11/2010 | Dhuse ......................... 707/770 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

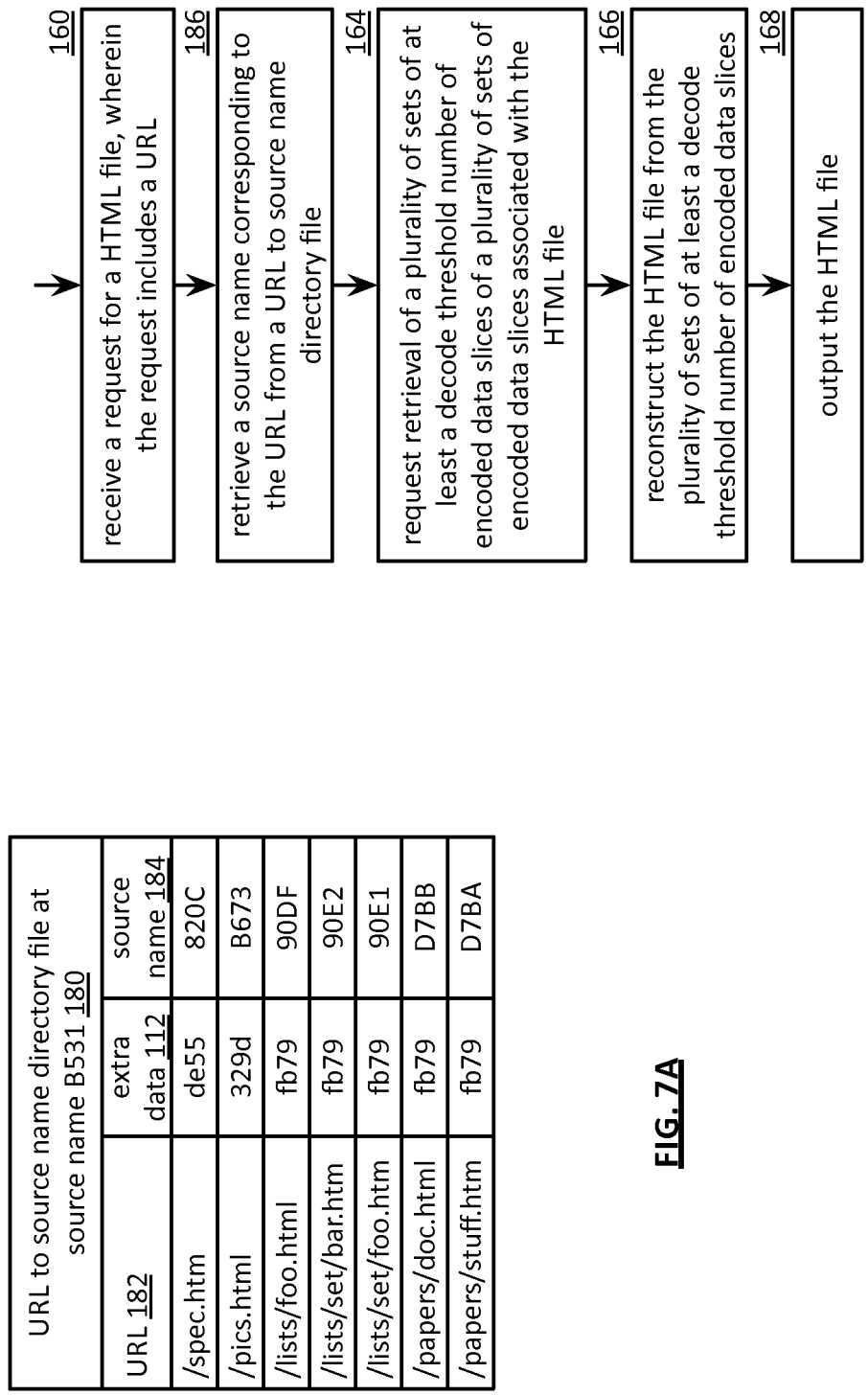

| domain name system (DNS) data file 250 | | | |
|---|---|---|---|
| URL domain 252 | source name 254 | DSN IP address 256 | DS unit storage set IP address range 258 |
| www.cleversafe.com | 90E1 | 66.232.111.124 | 66.232.111.125 - 66.232.111.128 |
| www.cleversafe.com/list.doc | 90E2 | 66.232.111.124 | 66.232.111.136 - 66.232.111.139 |
| www.cleversafe.org | 937C | 72.232.247.50 | 72.232.247.51 - 72.232.247.58 |
| www.caerusinstitute.com | 569D | 72.167.232.77 | 72.167.232.78 - 72.167.232.82 |

FIG. 11B
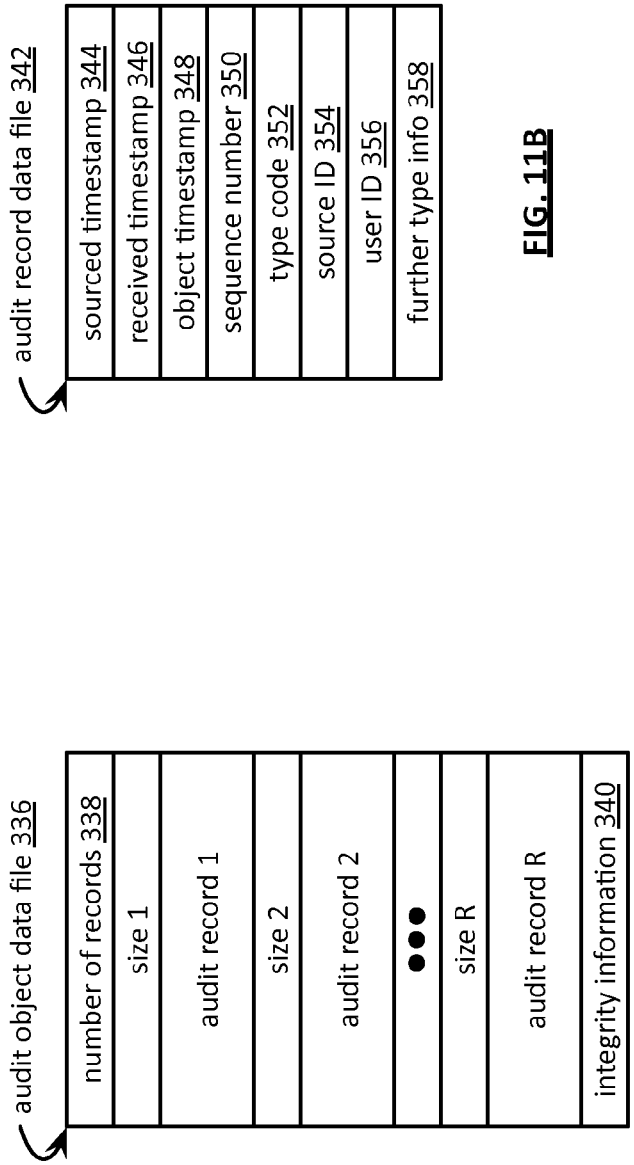
FIG. 11C
FIG. 11A

ACCESSING A SECOND WEB PAGE FROM A DISPERSED STORAGE NETWORK MEMORY BASED ON A FIRST WEB PAGE SELECTION

CROSS REFERENCE TO RELATED PATENTS

The present U.S. Utility Patent Application claims priority pursuant to 35 U.S.C. §119(e) to U.S. Provisional Application No. 61/483,856, entitled "Content Distribution Network Utilizing a Dispersed Storage Network," filed May 9, 2011, pending, which is incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 7A is a diagram illustrating an example of a directory file structure in accordance with the present invention;

FIG. 7B is a flowchart illustrating another example of accessing a data file in accordance with the present invention;

FIG. 9A is a diagram illustrating an example of a domain name system (DNS) file structure in accordance with the present invention;

FIG. 11A is a diagram illustrating an example of an audit object file structure in accordance with the present invention;

FIG. 11B is a diagram illustrating an example of an audit record file structure in accordance with the present invention;

FIG. 11C is a diagram illustrating an example of integrity information structure in accordance with the present invention;

DETAILED DESCRIPTION OF THE INVENTION

Figure 1:
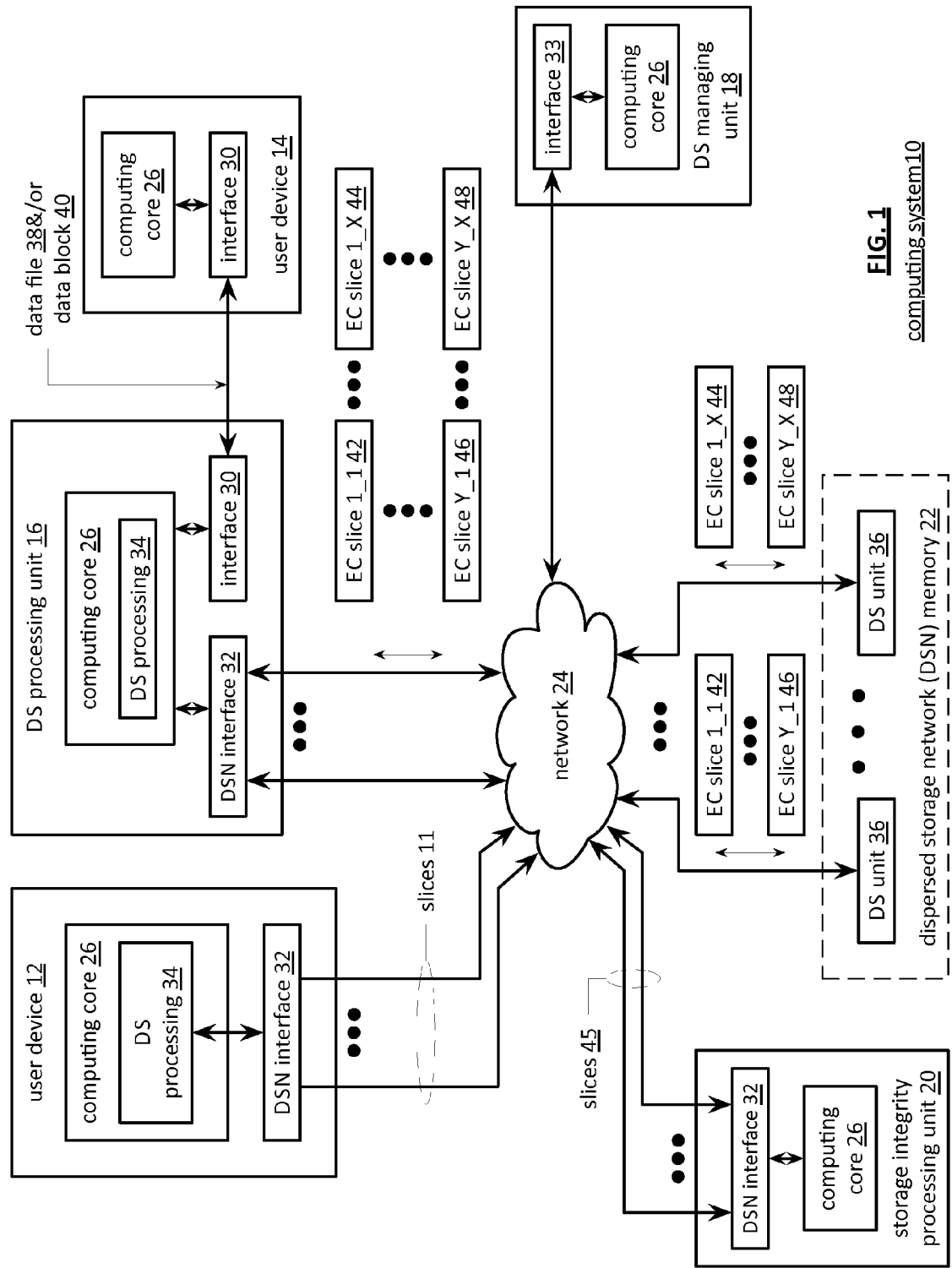
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding slice EC 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
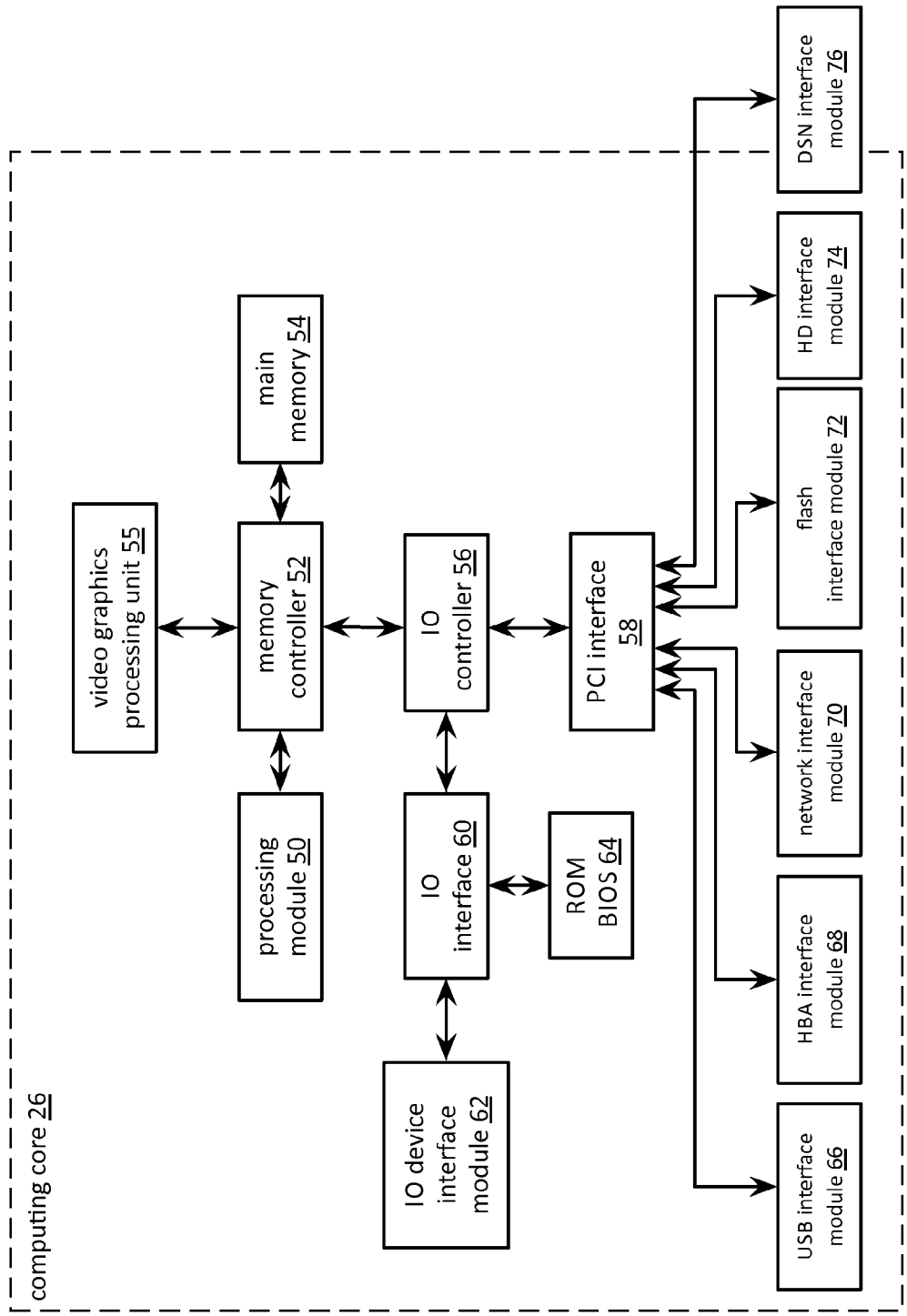
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
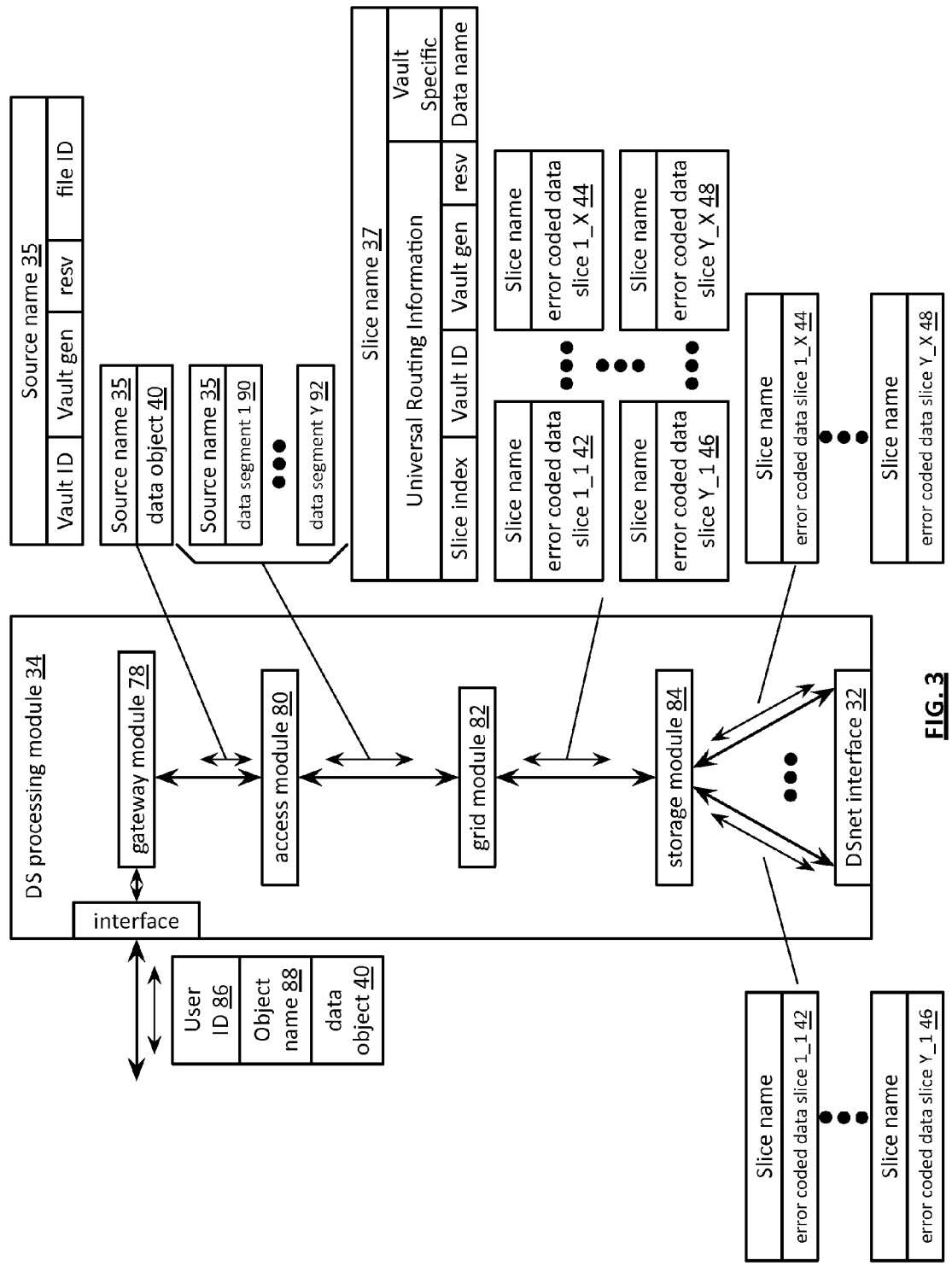
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131, 072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-48.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
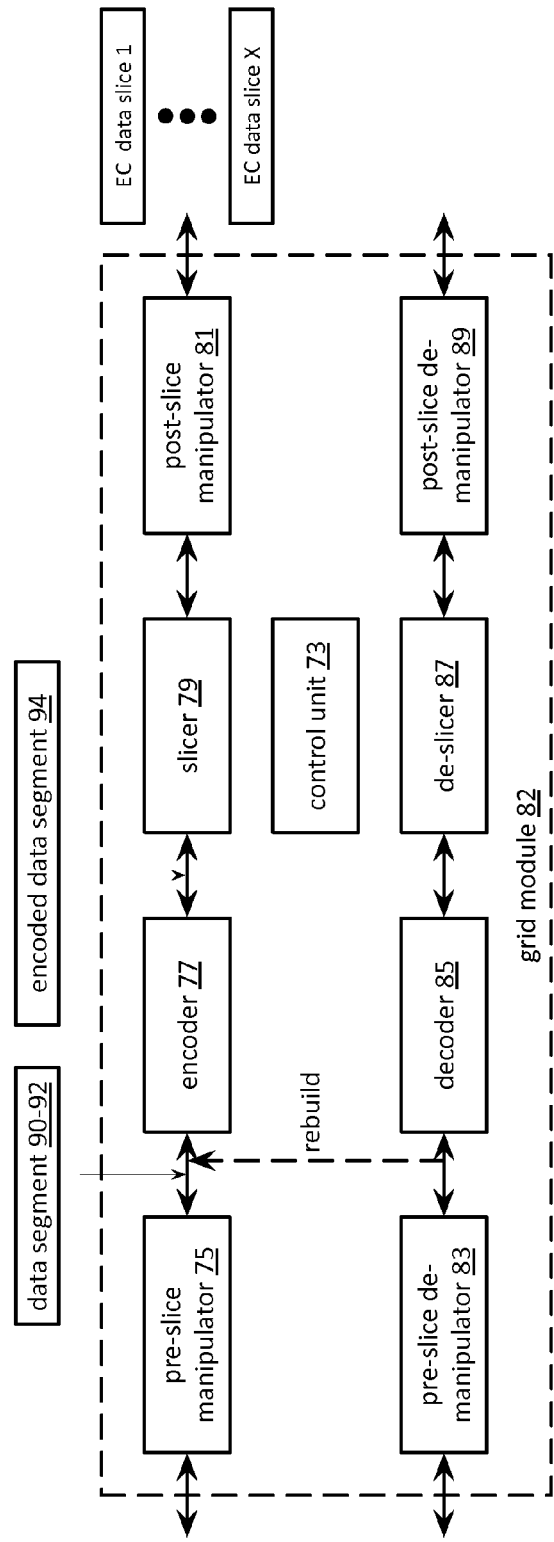
FIG. 4 is a schematic block diagram of an embodiment of a grid module in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 90-92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 90-92, the same encoding algorithm for the data segments 90-92 of a data object, or a combination thereof.

The encoded data segment 94 is of greater size than the data segment 90-92 by the overhead rate of the encoding algorithm by a factor of X/T, where X is the width or number of slices, and T is the read threshold. In this regard, the corresponding decoding process can accommodate at most X-T missing EC data slices and still recreate the data segment 90-92. For example, if X=16 and T=10, then the data segment 90-92 will be recoverable as long as 10 or more EC data slices per segment are not corrupted.

The slicer 79 transforms the encoded data segment 94 into EC data slices in accordance with the slicing parameter from the vault for this user and/or data segment 90-92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
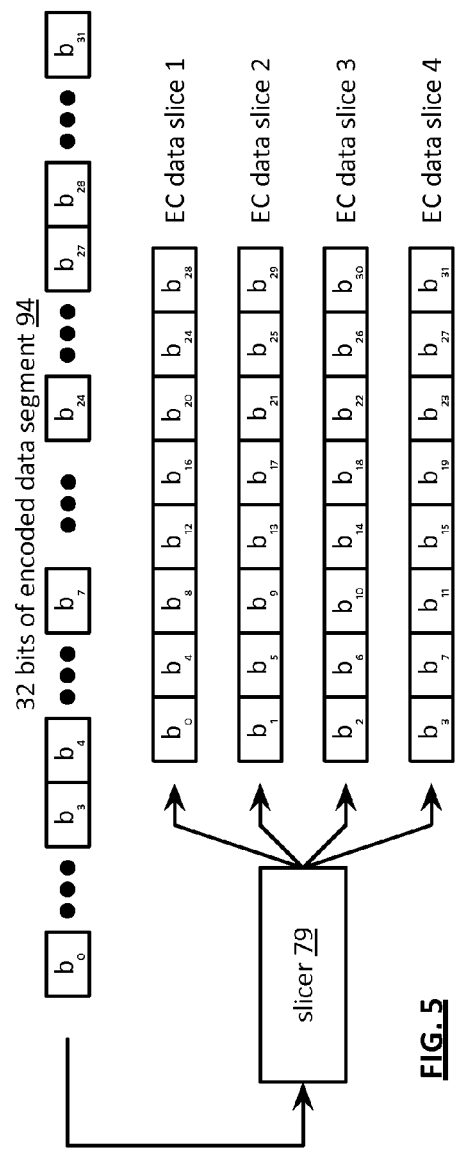
FIG. 5 is a diagram of an example embodiment of error coded data slice creation in accordance with the present invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
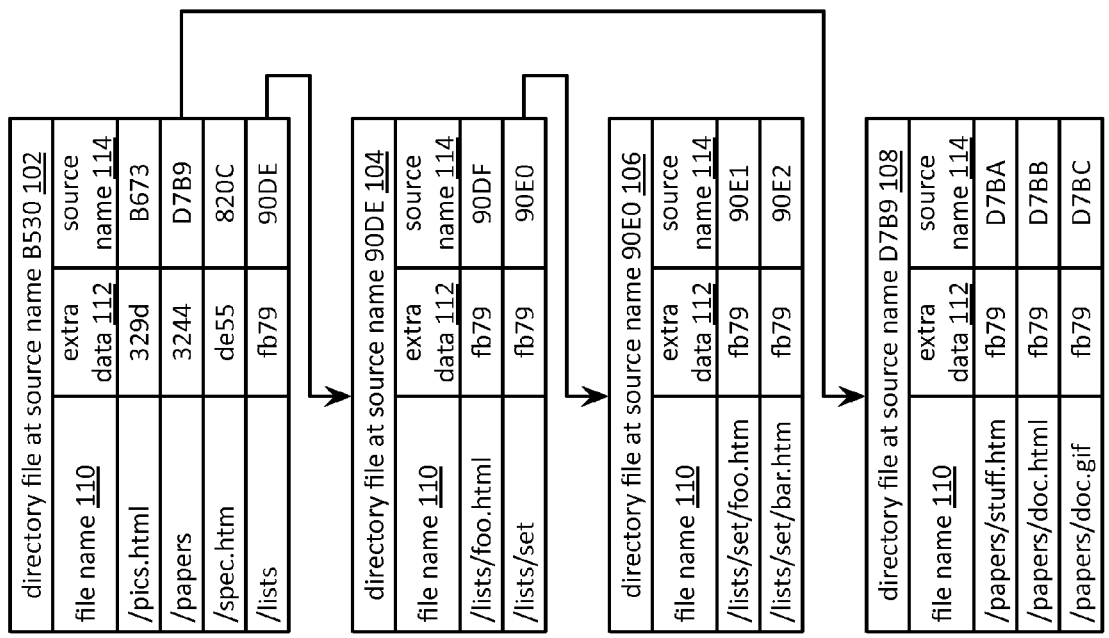
FIG. 6A is a diagram illustrating an example of a linked directory file structure in accordance with the present invention.

FIG. 6A is a diagram illustrating an example of a linked directory file structure. The structure includes a plurality of linked directory files 102-108, wherein each directory file is stored in a dispersed storage network (DSN) memory as one or more sets of encoded directory slices, and wherein each directory file is accessible at a source name DSN address. For example, a first directory file 102 is accessible at source name B530, a second directory file 104 is accessible at source name 90DE, a third directory file 106 is accessible at source name 90E0, and a fourth directory file 108 is accessible at D7B9.

Each directory file includes one or more entries, wherein each entry includes a file name field 110, an extra data field 112, and a source name field 114. For each entry of the directory file, the file name field 110 includes a file name entry associated with the directory file entry. The file name entry indicates at least a portion of a pathname from a root name to a filename. For example, a file name entry of /pics.html indicates a file name linking to a file. As another example, a file name entry of /papers indicates a continuing pathname linking to at least one other directory file. The extra data field 112 includes an extra data entry associated with the directory file entry. The extra data entry includes one or more of a snapshot identifier (ID), a timestamp, the size indicator, a segment allocation table (SAT) vault source name, metadata, and content (e.g., a portion of data file content). The source name field 114 includes a source name entry associated with the directory file entry. The source name entry indicates a DSN source name address (e.g., including a vault ID, a generation indicator, and an object number) of at least one of a linked data file and a linked directory file. For example, a source name entry of B673 indicates a source name associated with the directory file entry of data file /pics.html. As another example, a source name entry of D7B9 indicates a source name associated with a directory file entry of path /papers linked to the fourth directory file 108 (e.g., stored as one or more encoded directory slices at source name D7B9).

The linked directory file structure may be utilized to locate a DSN source name address of a desired data file stored as a plurality of sets of encoded data slices. For example, a source name address corresponding to data file /lists/set/bar.htm is desired. The first directory file 102 is accessed at source name B530 and the linked second directory file 104 source name address of 90DE is extracted from an entry of the source name field corresponding to a file name field entry of /lists within the file name field 110. Next, the second directory file 104 is accessed at source name 90DE and the linked second directory file source name address of 90E0 is extracted from an entry of the source name field 114 corresponding to a file name field entry of /lists/set within the file name field 100 and. Next, the third directory file 106 is accessed at source name 90E0 and a data file source name address of 90E2 is extracted from an entry of the source name field 114 corresponding to a file name field entry of /lists/set/bar.htm within the file name field 110. The DSN source name address 90E2 may be subsequently accessed to recover the desired data file of data file /lists/set/bar.htm. The directory file structure may be utilized in a method to access a hypertext markup language (HTML) file stored in the DSN memory. Such a method is discussed in greater detail with reference to FIGS. 6B-6C.

Figure 6B:
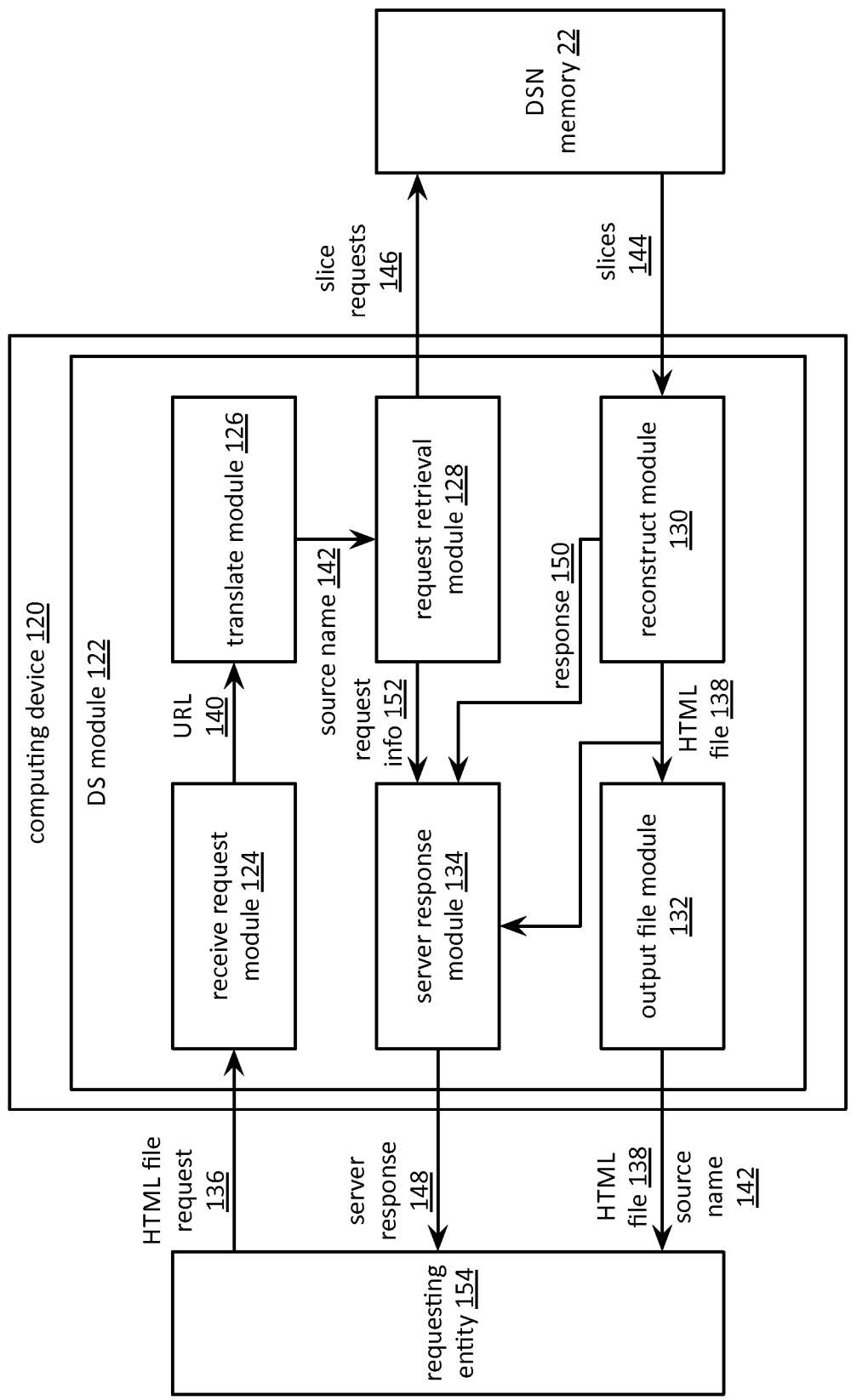
FIG. 6B is a schematic block diagram of another embodiment of a computing system in accordance with the present invention.

FIG. 6B is a schematic block diagram of another embodiment of a computing system that includes a computing device 120, a requesting entity 154, and a dispersed storage network (DSN) memory 22. The computing device may include at least one of a user device, a dispersed storage (DS) processing unit, a DS unit, a DS managing unit, and any other computing device operable to couple with the DSN memory 22. The computing device 120 includes a dispersed storage (DS) module 122. The requesting entity 154 includes at least one of the DS module 122, the user device, the DS processing unit, the DS unit, the DS managing unit, and any other computing device. The DS module 122 includes a receive request module 124, a translate module 126, a request retrieval module 128, a reconstruct module 130, an output file module 132, and a server response module 134.

The receive request module 124, when operable within the computing device 120, causes the computing device 120 to receive a request 136 for a hypertext markup language (HTML) file 138, wherein the HTML file 138 is encoded using a dispersed storage (DS) error coding function to produce a plurality of sets of encoded data slices, wherein the plurality of sets of encoded data slices is stored in the DSN memory 22, and wherein the request includes a universal record locator (URL) 140 associated with the HTML file 138. The receive request module 124 further functions to receive the request 136 by receiving a GET request in accordance with a hypertext protocol (HTTP). The receive request module 124 further functions to receive the request 136 from the requesting entity 154. The requesting entity 154 includes at least one of a user device, a DS processing unit, a DS unit, a DS managing unit, a module of the computing device 120, a module of the DS module 122, and a module within the DSN.

The translate module 126, when operable within the computing device 120, causes the computing device 120 to translate the URL 140 into a source name 142 associated with the plurality of sets of encoded data slices. The translate module 126 functions to translate the URL 140 into the source name 138 by obtaining a root directory associated with the DSN memory 22, identifying a pathname based on the URL 140 and the root directory, and accessing a DSN index utilizing the pathname to retrieve the source name 142. For example, the translate module 126 obtains a root directory associated with a DSN memory 22 of http://cleversafe and identifies a pathname of http://cleversafe/lists/foo.html based on a URL of /lists/foo.html and the root directory of http://cleversafe. Next, the translate module 126 accesses the DSN index utilizing the pathname of http://cleversafe/lists/foo.html to retrieve a source name of 90DF. For instance, the translate module 126 accesses a directory file at source name B530 to match a filename of /lists to identify a source name of 90DE associated with a subsequent directory file at source name 90DE. Next, the translate module 126 accesses the directory file at source name 90DE and matches a filename of lists/foo.html to identify the source name of 90DF associated with the desired HTML file 138. The translate module 126 further functions to translate the URL 140 into the source name 138 by accessing a URL to source name table utilizing the URL140 to retrieve the source name 142. For example, the translate module 126 utilizes the URL of lists/foo.html to index into the URL to source name table to retrieve the source name of 90DF.

The request retrieval module 128, when operable within the computing device 120, causes the computing device 120 to request retrieval of a plurality of sets of at least a decode threshold number of encoded data slices 144 of the plurality of sets of encoded data slices from the DSN memory 22 in accordance with the source name 142. The request retrieval module 128 functions to request retrieval by generating a plurality of sets of at least a decode threshold number of slice names corresponding to the plurality of sets of at least the decode threshold number of encoded data slices 144 based on the source name 142, generating a plurality of sets of at least a decode threshold number of read slice requests 146 that includes the plurality of sets of least the decode threshold number of slice names, and sending the plurality of sets of at least the decode threshold number of read slice requests 146 to the DSN memory 22.

The reconstruct module 130, when operable within the computing device 120, causes the computing device 120 to, as the plurality of sets of at least a decode threshold number of encoded data slices 144 is being received, reconstruct the HTML file 138 from the plurality of sets of the at least the decode threshold number of encoded data slices 144. The reconstruct module 130 functions to reconstruct the HTML file 138 by, for each set of the at least the decode threshold number of encoded data slices, decoding the set of at least the decode threshold number of encoded data slices using the DS error coding function to produce a data segment of a plurality of data segments. Next, the reconstruct module 130 aggregates the plurality of data segments to reproduce the HTML file 138.

The output file module 132, when operable within the computing device 120, causes the computing device 120 to output the HTML file 138 to the requesting entity 154 in accordance with a hypertext protocol (HTTP). For example, the output file module 132 adds at least one of a header, a status code, an error message to output the HTML file 138 in accordance with the HTTP. The output file module 132 further functions to output the HTML file 138 by outputting the source name 142 to the requesting entity 154, such that the requesting entity 154 caches the source name 142 for subsequent access of the HTML file 138.

The server response module 134, when operable within the computing device 120, causes the computing device 120 to generate one or more hypertext protocol (HTTP) response status codes based on a response 150 to the requesting retrieval of the plurality of sets of the at least the decode threshold number of encoded data slices (e.g., request info 152), generate a server response 148 that includes at least one of the HTML file 138 and the one or more HTTP response status codes, and output the server response 148 to the requesting entity 154. The server response module 134 generates the one or more HTTP response status codes to include one or more of an OK code #200 when retrieval of the HTML file 138 is favorable, an accepted code #202 when the source name 142 is valid within the DSN memory 22, a no content code #204 when the HTML file 138 does not exist in the DSN memory 22, a bad request code #400 when the URL 140 does not translate into a valid source than 142, and an unauthorized code #401 when the requesting entity 154 is not allowed to access the HTML file 138 from the DSN memory 22.

Figure 6C:
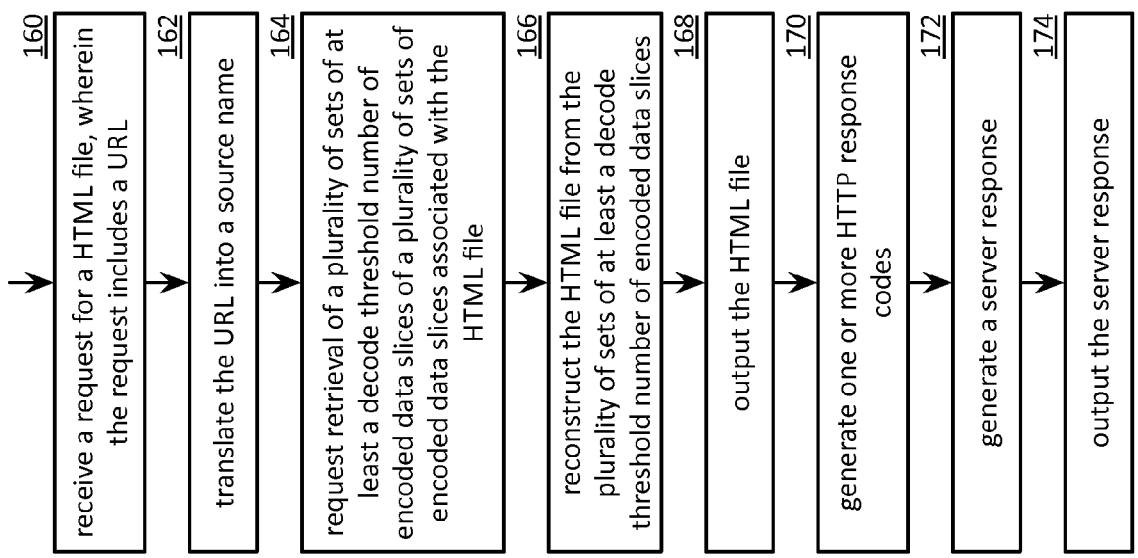
FIG. 6C is a flowchart illustrating an example of accessing a data file in accordance with the present invention.

FIG. 6C is a flowchart illustrating an example of accessing a data file. The method begins at step 160 where a processing module (e.g., of a dispersed storage (DS) processing module) receives a request for a hypertext markup language (HTML) file, wherein the HTML file is encoded using a dispersed storage (DS) error coding function to produce a plurality of sets of encoded data slices, wherein the plurality of sets of encoded data slices is stored in a dispersed storage network (DSN) memory, and wherein the request includes a universal record locator (URL) associated with the HTML file. The receiving the request further includes receiving a GET request in accordance with a hypertext protocol (HTTP).

The method continues at step 162 where the processing module translates the URL into a source name associated with the plurality of sets of encoded data slices. The translating the URL into the source name includes obtaining a root directory associated with the DSN memory, identifying a pathname based on the URL and the root directory (e.g., by appending the URL to the root directory), and accessing a DSN index utilizing the pathname to retrieve the source name. For example, the processing module produces a full pathname of c:\urldirectory\lists\set\bar.htm when the root directory is c:\urldirectory and the URL is lists\set\bar.htm. As another example, the processing module accesses a DSN index (e.g., a DSN directory structure as illustrated in FIG. 6A) utilizing the full pathname of c:\urldirectory\lists\set\bar.htm to retrieve source name 90E2. The translating the URL into the source name further includes accessing a URL to source name table or directory utilizing the URL to retrieve the source name (e.g., a lookup). For example, processing module accesses the URL to source name directory utilizing the URL of \lists\set\bar.htm to retrieve source name 90E2.

The method continues at step 164 where the processing module requests retrieval of a plurality of sets of at least a decode threshold number of encoded data slices of the plurality of sets of encoded data slices from the DSN memory in accordance with the source name. The requesting retrieval includes generating a plurality of sets of at least a decode threshold number of slice names corresponding to the plurality of sets of at least the decode threshold number of encoded data slices based on the source name, generating a plurality of sets of at least a decode threshold number of read slice requests that includes the plurality of sets of least the decode threshold number of slice names, and sending the plurality of sets of at least the decode threshold number of read slice requests to the DSN memory.

The method continues at step 166 where, as the plurality of sets of at least a decode threshold number of encoded data slices is being received, the processing module reconstructs the HTML file from the plurality of sets of the at least the decode threshold number of encoded data slices. The reconstructing the HTML file includes, for each set of the at least the decode threshold number of encoded data slices, decoding the at least the decode threshold number of encoded data slices using the DS error coding function to produce a data segment of a plurality of data segments. Next, the plurality of data segments are aggregated to reproduce the HTML file.

The method continues at step 168 where the processing module outputs the HTML file to a requesting entity in accordance with a hypertext protocol (HTTP). For example, the processing module adds at least one of a header, a status code, an error message to output the HTML file in accordance with the HTTP. The outputting the HTML file further includes outputting the source name to the requesting entity, such that the requesting entity caches the source name for subsequent access of the HTML file.

The method continues at step 170 where the processing module generates one or more hypertext protocol (HTTP) response status codes based on response to the requesting retrieval of the plurality of sets of the at least the decode threshold number of encoded data slices. The generating includes generates the one or more HTTP response status codes to include one or more of an OK code #200 when retrieval of the HTML file 138 is favorable, an accepted code #202 when the source name 142 is valid within the DSN memory 22, a no content code #204 when the HTML file 138 does not exist in the DSN memory 22, a bad request code #400 when the URL 140 does not translate into a valid source than 142, and an unauthorized code #401 when the requesting entity 154 is not allowed to access the HTML file 138 from the DSN memory 22. The method continues at step 172 where the processing module generates a server response in accordance with the HTTP that includes at least one of the HTML file and the one or more HTTP response status codes. The method continues at step 174 where the processing module outputs the server response to the requesting entity. Alternatively, the processing module outputs the HTML file exclusively within the server response.

FIG. 7A is a diagram illustrating an example of a directory file structure. The structure includes a universal record locator (URL) to source name directory file 180, wherein the directory file 180 is stored in a dispersed storage network (DSN) memory as one or more sets of encoded directory slices, and wherein the directory file is accessible at a source name DSN address. For example, the URL to source name directory file 180 is accessible at source name B531.

The directory file 180 includes one or more entries, wherein each directory file entry includes a URL field 182, an extra data field 112, and a source name field 184. For each entry of the directory file 180, the URL field 182 includes an URL entry associated with the directory file entry. The one or more entries of the directory file 180 may be sorted by the URL entry in accordance with a sorting scheme (e.g., numeric, alphanumeric, by file extension type, by content type, etc.). The URL entry indicates at least a portion of a pathname that includes a filename of a hypertext markup language (HTML) data file stored in the DSN memory. For example, a URL entry of /pics.html indicates a URL linking to HTML data file pic.html. As another example, a URL entry of /papers/stuff.htm indicates a file name linking to HTML data file stuff.htm.

The extra data field 112 includes an extra data entry associated with the directory file entry. The extra data entry includes one or more of a snapshot identifier (ID), a timestamp, the size indicator, a segment allocation table (SAT) vault source name, metadata, and content (e.g., a portion of data file content). The source name field 184 includes a source name entry associated with the directory file entry. The source name entry indicates a DSN source name address (e.g., including a vault ID, a generation indicator, and an object number) of an HTML data file. For example, a source name entry of B673 indicates a source name associated with the directory file entry of HTML data file /pics.html. As another example, a source name entry of D7BA indicates a source name associated with a directory file entry of HTML data file /papers/stuff.htm.

The a directory file structure may be utilized to locate a DSN source name address of a desired HTML data file that is stored as a plurality of sets of encoded data slices in the DSN memory. For example, a source name address corresponding to HTML data file /lists/set/bar.htm is desired. The directory file 180 is accessed at source name B531 and the HTML data file source name address of 90E2 is extracted from an entry of the source name field 184 corresponding to a URL field entry of /lists/set/bar.htm within the URL field when the desired data file is a HTML data file. DSN source name address 90E2 may be subsequently accessed to recover the desired HTML data file /lists/set/bar.htm.

FIG. 7B is a flowchart illustrating another example of accessing a data file that includes similar steps to FIG. 6C. The method begins with step 160 of FIG. 6C where a processing module (e.g., of a dispersed storage (DS) processing module) receives a request for a hypertext markup language (HTML) file, wherein the request includes a universal record locator (URL) associated with the HTML file.

The method continues at step 186 where the processing module retrieves a source name corresponding to the URL from a URL to source name directory file. For example, the processing module accesses a source name within a dispersed storage network (DSN) associated with the URL to source name directory file when the request includes the URL to retrieve encoded directory slices. The processing module dispersed storage error decodes the directory slices to produce the URL to source name directory file. The processing module identifies a URL field entry corresponding to the URL and extracts the source name corresponding to the URL.

The method continues with steps 164-168 of FIG. 6C where the processing module request retrieval of a plurality of sets of at least a decode threshold number of encoded data slices of a plurality of sets of encoded data slices associated with the HTML file, reconstructs the HTML file from the plurality of sets of at least a decode threshold number of encoded data slices, and outputs the HTML file.

Figure 8A:
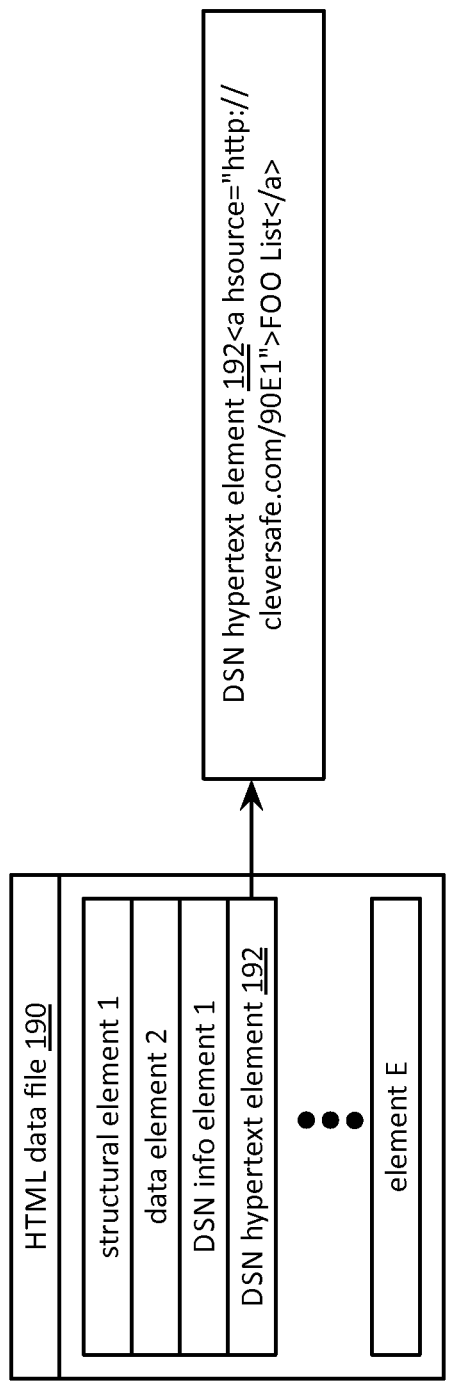
FIG. 8A is a diagram illustrating an example of a web page file structure in accordance with the present invention.

FIG. 8A is a diagram illustrating an example of a web page file structure. The a structure includes a hypertext markup language (HTML) data file 190, wherein the HTML data file 190 is stored in a dispersed storage network (DSN) as one or more sets of encoded data slices, and wherein the HTML data file is accessible at a DSN address (e.g., a source name) of DSN location information.

The HTML data file 190 includes one or more elements 1-E. For example, the HTML data file 190 includes a structural element 1 (e.g., including web page structure information), a data element 2 (e.g., including presentation information), a DSN information element 1 (e.g., DSN registry information, vault information, codec stack information, a primary source name, one or more secondary source names including source names of video files of common content but with different resolutions, and a data file offset), and a DSN hypertext element 192 (e.g., including DSN hypertext element information).

The DSN hypertext element 192 includes one or more of a DSN identifier (ID), a DSN internet protocol (IP) address, a DS unit storage set ID, a DS unit storage set IP address set, a root universal record locator (URL), a source name of a linked file (e.g., web page) associated with the root URL, a file name, a file ID, a vault ID, and a snapshot ID. For example, a DSN hypertext element displayed as "FOO list" may include a DSN ID as identified in the DSN hypertext element as <a hsource="http://cleversafe.com/90E1">FOO List</a>. In such an instance, a desired HTML data file of foo.htm may be retrieved from source name address 90E1 of the cleversafe.com DSN domain when the DSN hypertext element is selected.

Figure 8B:
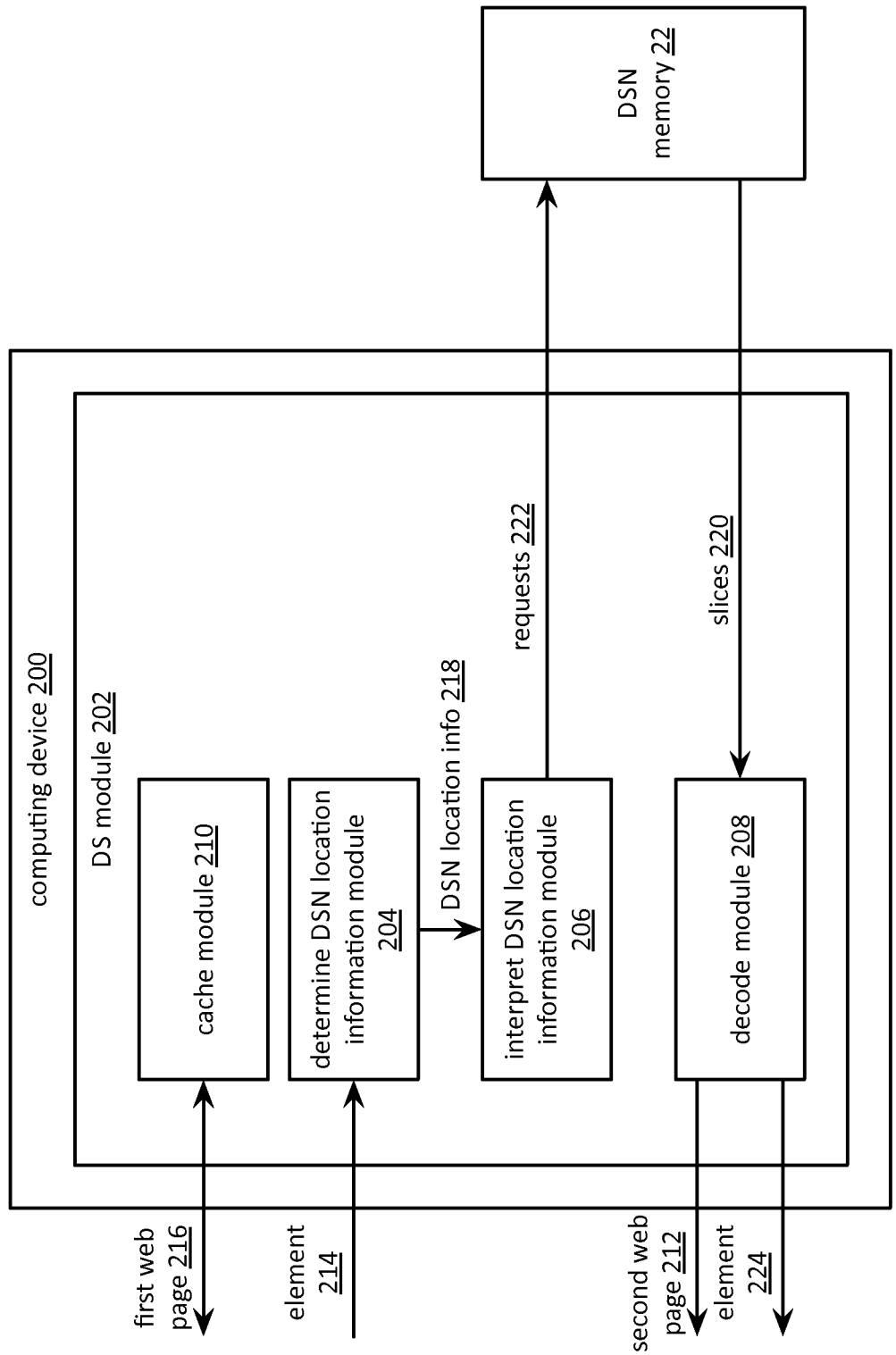
FIG. 8B is a schematic block diagram of another embodiment of a computing system in accordance with the present invention.

FIG. 8B is a schematic block diagram of another embodiment of a computing system that includes a computing device 200 and a dispersed storage network (DSN) memory 22. The computing device 200 may include at least one of a user device, a dispersed storage (DS) processing unit, a DS unit, a DS managing unit, and any other computing device operable to couple with the DSN memory 22. The computing device 200 includes a dispersed storage (DS) module 202. The DS module 202 includes a determine DSN location information module 204, an interpret DSN location information module 206, a decode module 208, and a cache module 210.

The determine DSN location information module 204, when operable within the computing device 200, causes the computing device 200 to, when a second web page 212 is selected based on an element 214 of a first web page 216, determine DSN location information 218 for the second web page 212. For example, the first web page 216 is presented (e.g., displayed) which includes rendering an image associated with a plurality of elements that includes the element 214 and a selection is produced that includes the element 214 (e.g., a user clicks on a portion of an image associated with the element 214). The determine DSN location information module 204 determines the DSN location information 218 by at least one extracting the DSN location information 218 from the element 214 of the first web page 216, wherein the element 214 is a hypertext element and determining the DSN location information 218 based on selection of the hypertext element. The determining includes one or more of extracting the DSN location information 218 from the hypertext element, retrieving the DSN location information 8 21 from a hypertext element table utilizing the hypertext element as an index into the table, and retrieving the DSN location information 218 from the DSN utilizing a DSN address from the hypertext element.

The determine DSN location information module 204 further determines the DSN location information 218 by at least one of determining a DSN identifier (ID) that identifies one of a plurality of dispersed storage networks and determining DSN addressing information regarding storage of the plurality of sets of the least the decode threshold number of encoded data slices. The determining the DSN ID includes identifying, from the element 214, one or more of a DSN number, a DSN internet protocol address, a dispersed storage (DS) unit storage set ID, and set of internet protocol addresses corresponding to the DS unit storage set. The determining the DSN addressing information includes identifying, from the element 214, one or more a universal record locator (URL), a DSN vault ID, a source name corresponding to a second web page file, a source name corresponding to a segment allocation table, a plurality of sets of slice names corresponding to the plurality of sets of at least the decode threshold number of encoded data slices, a pathname corresponding to the second web page file, a filename, a revision number, and a snapshot ID. The determine DSN location information module 204, when operable within the computing device 200, further causes the computing device 200 to, when a third web page is selected based on a hypertext element of the second web page 212, determine third DSN location information for the third web page.

The interpret DSN location information module 206, when operable within the computing device 200, causes the computing device 200 to interpret the DSN location information 218 to request retrieval of a plurality of sets of at least a decode threshold number of encoded data slices 220 from a DSN (e.g., from the DSN memory 22). The interpret DSN location information module 206 further interprets the DSN location information 218 by at least one of determining slices names for the plurality of sets of the least the decode threshold number of encoded data slices 220 and issuing a plurality of requests 222 based on the slices names and determining DS units storing the plurality of sets of the least the decode threshold number of encoded data slices and issuing a plurality of requests to the DS units. The issuing the plurality of requests to the DS units includes generating the plurality of requests to include the slice names (e.g., one request per slice name, one request per group of slice names that include a common pillar number), outputting the plurality of requests to the DS units, and receiving the plurality of sets of the at least the decode threshold number of encoded data slices 220. The interpreting the DSN location information to request retrieval further includes generating a second web page file request that includes at least a portion of the DSN location information, identifying the DSN from the DSN location information, sending the second web page file request to the DSN (e.g., send to internet protocol address of DSN or to internet protocol addresses of the DS units), and receiving the second webpage file from the DSN. The interpret DSN location information module 206, when operable within the computing device 200, further causes the computing device 200 to, when the third web page is selected, interpret the third DSN location information to request retrieval of a third plurality of sets of at least a decode threshold number of encoded data slices from the DSN.

The decode module 208, when operable within the computing device 200, causes the computing device 200 to decode, using a DS error coding function, a set of the plurality of sets of the least the decode threshold number of encoded data slices 220 to reproduce an element 224 of the second web page 212. The decoding further includes decoding, using the DS error coding function, two or more sets of the plurality of sets of the least the decode threshold number of encoded data slices 220 to reproduce the element 222 of the second web page 212. The decode module 208 is further operable to decode, using the DS error coding function, a second set of the plurality of sets of the least the decode threshold number of encoded data slices 220 to reproduce at least a portion of a second element of the second web page. The decode module 208 is further operable to decode, using the DS error coding function, the second set of the plurality of sets of the least the decode threshold number of encoded data slices to reproduce a portion of a third element and a portion of a fourth element of the second web page. The decode module 208, when operable within the computing device 200, further causes the computing device 200 to, when the third web page is selected, decode, using the DS error coding function, a set of the third plurality of sets of the least the decode threshold number of encoded data slices to reproduce an element of the third web page.

The cache module 210, when operable within the computing device 200, causes the computing device 200 to cache a plurality of elements of the first web page 216, wherein the plurality of elements includes the element 214. Such caching enables subsequent reloading of the first web page 216. The caching includes one or more of receiving the first web page 216, receiving the plurality of elements of the first web page 216, receiving the element 214, and facilitating storage of the plurality of elements of the first webpage 216 (e.g., in a local cache memory, in the DSN).

Figure 8C:
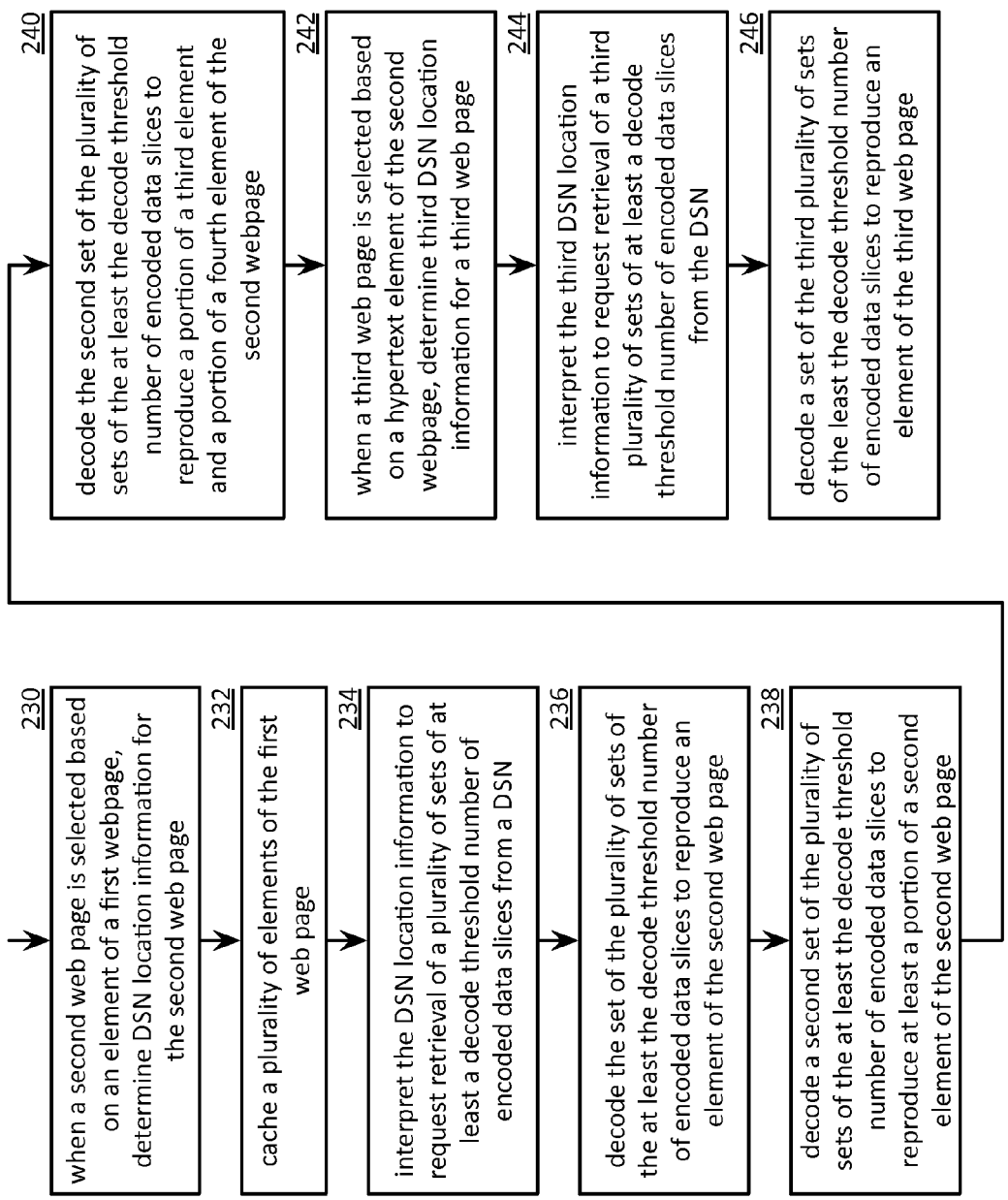
FIG. 8C is a flowchart illustrating an example of accessing a secondary web page file in accordance with the present invention.

FIG. 8C is a flowchart illustrating an example of accessing a secondary web page file. The method begins at step 230 where a processing module (e.g., a dispersed storage module), when a second web page is selected based on an element of a first web page, determines dispersed storage network (DSN) location information for the second web page. For example, the first web page is presented (e.g., displayed) which includes rendering an image associated with a plurality of elements that includes the element and a selection is produced that includes the element (e.g., a user clicks on a portion of an image associated with the element). The determining the DSN location information includes at least one extracting the DSN location information from the element of the first web page, wherein the element is a hypertext element and determining the DSN location information based on selection of the hypertext element. The determining includes one or more of extracting the DSN location information from the hypertext element, retrieving the DSN location information from a hypertext element table utilizing the hypertext element as an index into the table, and retrieving the DSN location information from the DSN utilizing a DSN address from the hypertext element.

The determining the DSN location information further includes at least one determining a DSN identifier (ID) that identifies one of a plurality of dispersed storage networks and determining DSN addressing information regarding storage of the plurality of sets of the least the decode threshold number of encoded data slices. The determining the DSN location information includes identifying, from the element, one or more of a DSN number, a DSN internet protocol address, a dispersed storage (DS) unit storage set ID, and set of internet protocol addresses corresponding to the DS unit storage set. For example, the processing module extracts a DSN ID of cleversafe.com and a source name of 90E1 when hypertext element selection is <a hsource="http://cleversafe.com/90E1">FOO List</a>.

The determining the DSN addressing information includes identifying, from the element, one or more a universal record locator (URL), a DSN vault ID, a source name corresponding to a second web page file, a source name corresponding to a segment allocation table, a plurality of sets of slice names corresponding to the plurality of sets of at least the decode threshold number of encoded data slices, a pathname corresponding to the second web page file, a filename, a revision number, and a snapshot ID.

The method continues at step 232 where the processing module caches a plurality of elements of the first web page, wherein the plurality of elements includes the element. The caching includes one or more of receiving the first web page, receiving the plurality of elements of the first web page, receiving the element, and facilitating storage of the plurality of elements of the first webpage (e.g., in a local cache memory, in the DSN).

The method continues at step 234 where the processing module interprets the DSN location information to request retrieval of a plurality of sets of at least a decode threshold number of encoded data slices from a DSN. The requesting retrieval of the plurality of sets of at least the decode threshold number of encoded data slices from the DSN includes at least one of sending a request to the DSN, sending a set of requests to a set of DS units of the DSN, and sending a plurality of requests to the DS units. The interpreting the DSN location information further includes at least one of determining slices names for the plurality of sets of the least the decode threshold number of encoded data slices and issuing a plurality of requests based on the slices names and determining DS units storing the plurality of sets of the least the decode threshold number of encoded data slices and issuing a plurality of requests to the DS units.

The issuing the plurality of requests to the DS units includes generating the plurality of requests to include the slice names (e.g., one request per slice name, one request per group of slice names that include a common pillar number), identifying internet protocol addresses of the DS units, outputting the plurality of requests to the DS units, and receiving the plurality of sets of the at least the decode threshold number of encoded data slices. The identifying of the internet protocol addresses of the DS units includes at least one of performing a table lookup based on the DSN ID and a domain name system (DNS) server query based on the DSN ID (e.g., cleversafe.com). The interpreting the DSN location information to request retrieval further includes generating a second web page file request that includes at least a portion of the DSN location information, identifying the DSN from the DSN location information, sending the second web page file request to the DSN (e.g., send to internet protocol address of DSN or to internet protocol addresses of the DS units), and receiving the second webpage file from the DSN.

The method continues at step 236 where the processing module decodes, using a DS error coding function, a set of the plurality of sets of the least the decode threshold number of encoded data slices to reproduce an element of the second web page. The decoding further includes decoding, using the DS error coding function, two or more sets of the plurality of sets of the least the decode threshold number of encoded data slices to reproduce the element of the second webpage.

The method continues at step 238 where the processing module decodes, using the DS error coding function, a second set of the plurality of sets of the least the decode threshold number of encoded data slices to reproduce at least a portion of a second element of the second web page. The method continues at step 240 where the processing module decodes, using the DS error coding function, the second set of the plurality of sets of the least the decode threshold number of encoded data slices to reproduce a portion of a third element and a portion of a fourth element of the second web page. The method continues at step 242 where the processing module, when a third web page is selected based on a hypertext element of the second web page, determines third DSN location information for the third web page. The method continues at step 244 where the processing module interprets the third DSN location information to request retrieval of a third plurality of sets of at least a decode threshold number of encoded data slices from the DSN. The method continues at step 246 where the processing module decodes, using the DS error coding function, a set of the third plurality of sets of the least the decode threshold number of encoded data slices to reproduce an element of the third web page.

FIG. 9A is a diagram illustrating an example of a domain name system (DNS) data file structure. The structure includes a DNS data file 250, wherein the DNS data file 250 may be stored in a dispersed storage network (DSN) as one or more sets of encoded data slices, and wherein the DNS data file 250 is accessible via a source name DSN address of the DNS data file when the DNS data file is stored as the one or more sets of encoded data slices.

The DNS data file 250 includes one or more DNS data file entries, wherein each DNS data file entry of the one more DNS data file entries includes a universal record locator (URL) domain field 252, a source name field 254, a DSN Internet protocol (IP) address field 256, and a dispersed storage (DS) unit storage set IP address range field 258. For each DNS data file entry, the URL domain field 252 includes a URL domain entry that includes a URL domain name associated with a DSN of the DNS data file entry utilized to store at least one hypertext markup language (HTML) data file. For example, a URL domain entry of www.cleversafe.com indicates at least one HTML data file associated with the www-.cleversafe.com domain.

The source name field 254 includes a source name entry corresponding to the URL domain entry of the DNS data file entry that includes a DSN source name address (e.g., including a vault identifier (ID), a vault generation ID, and an object number) associated with a HTML data file stored as encoded slices within a DSN. For example, a source name entry of 90E1 indicates a source name of a HTML data file stored at a DSN system associated with the www.cleversafe.com domain with a DSN IP address of 66.232.111.124.

The DSN IP address field 256 includes a DSN IP address entry corresponding to the URL domain entry of the DNS data file entry that includes an IP address associated with the URL domain entry. For example, a DSN system of the www.cleversafe.com domain may be accessed utilizing a DSN IP address of 66.232.111.124. The DS unit storage set IP address range field 258 includes a DS unit storage set IP address range entry corresponding to the source name entry of the DNS data file entry that identifies IP address ranges associated with a DS unit storage set within the DSN that utilized to store the HTML data file corresponding to the source name entry. For example, a DS unit storage set may be accessed at an IP address range of 66.232.111.125-66.232.111.128 to access the HTML data file stored at the source name of 90E1 within the DSN system associated with the www.cleversafe.com domain. As another example, a DS unit storage set may be accessed at an IP address range of 66.232.111.136-66.232.111.139 to access a HTML data file stored at the source name of 90E2 within the DSN system associated with a URL domain entry of www.cleversafe.com/list.doc.

Figure 9B:
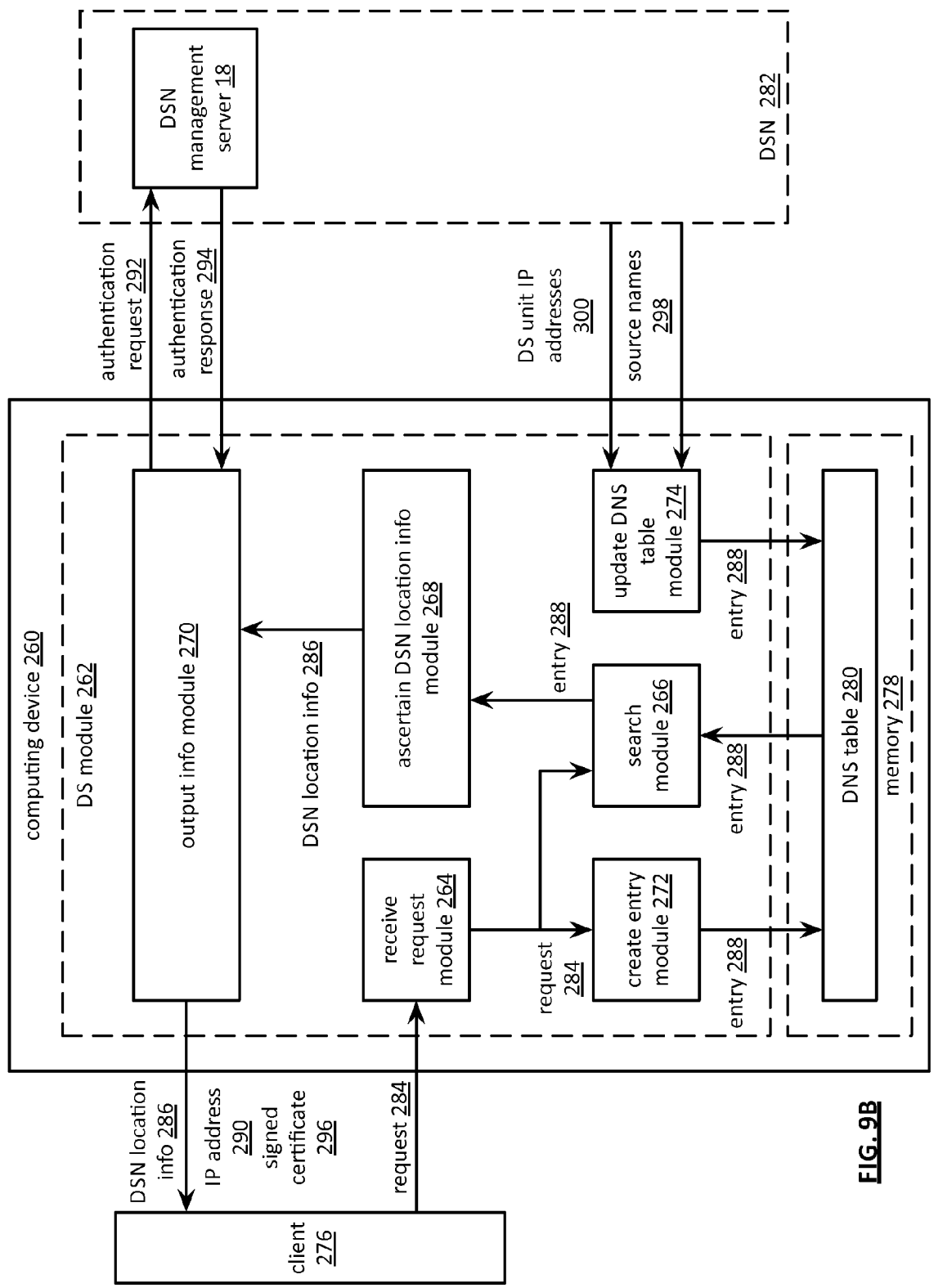
FIG. 9B is a schematic block diagram of another embodiment of a computing system in accordance with the present invention.

FIG. 9B is a schematic block diagram of another embodiment of a computing system that includes a computing device 260, a client 276, and a dispersed storage network (DSN) 282. The DSN 282 includes a DSN management server 18 (e.g., a DS managing unit 18) and may also include one or more of a dispersed storage (DS) processing unit and one or more sets of DS units. The client 276 may include a user device. The computing device 260 includes a DS module 262 and a memory 278. The computing device 260 may be implemented utilizing at least one of a user device, a DS processing unit, a DS unit, a DS managing unit, and any other computing device. The memory 278 includes a domain name system (DNS) table 280. The DS module 262 includes a receive request module 264, a search module 266, an ascertain DSN location information module 268, an output information module 270, a create entry module 272, and an update DNS table module 274.

The receive request module 264, when operable within the computing device 260, causes the computing device 260 to receive, from the client 276, a request 284 regarding DSN location information 286 of a hypertext markup language (HTML) file. The request 284 includes at least one of a retrieval request and a creation request. The retrieval request includes at least one of an identifier (ID) of the DSN 282, a universal record locator (URL) associated with the HTML file, and a source name associated with a plurality of sets of encoded data slices of the HTML file. The DSN location information 286 includes at least one of a set of DS unit internet protocol addresses 300, a plurality of sets of slice names associated with the plurality of sets of encoded data slices, an identifier of the DSN 282, and a DSN internet protocol (IP) address 290 for the DSN management server 18.

The search module 266, when operable within the computing device 260, causes the computing device 260 to search the DNS table 280 for an entry 288 regarding the HTML file based on information of the request 284. The search module 266 further functions to search the DNS table 280 for the entry 288 based on the at least one of the identifier of the DSN, the URL, and the source name of the request 284 when the request 284 is the retrieval request. The search module 266 further functions to search the DNS table 280 for the entry 288 based on the source name when the retrieval request includes the source name. The ascertain DSN location information module 268, when operable within the computing device 260, causes the computing device 260 to, when the entry 288 is found, ascertain the DSN location information 286 regarding the plurality of sets of encoded data slices, wherein the HTML file is encoded using a DS error coding function to produce the plurality of sets of encoded data slices and wherein the plurality of sets of encoded data slices is stored in the DSN 282.

The output information module 270, when operable within the computing device 260, causes the computing device 260 to output the DSN location information 286 to the client 276. The output information module 270 further functions to output the DSN location information 286 by determining whether accessing the HTML file requires authentication and when accessing the HTML file requires authentication, outputting, to the client 276, a DSN internet protocol (IP) address 290 for the DSN management server 18 and when an authentication notice is received (e.g., from the DSN management server 18, from the client 276), outputting the DSN location information 286 to the client 276. The output information module 270 further functions to output the DSN location information 286 by determining whether accessing the HTML file requires authentication and when accessing the HTML file requires authentication, outputting a DSN authentication request 292 to the DSN management server 18 based on the DSN internet protocol address 290. Next, the output information module 270 receives, from the DSN management server 18, a DSN authentication response 294 that includes a signed certificate 296, and outputs the DSN location information 286 and the signed certificate 296 to the client 276.

The create entry module 272, when operable within the computing device 260, causes the computing device 260 to, when the request 284 is the creation request to create the entry 288 in the DNS table 280, create the entry 288 to include one or more of, an identifier of the DSN, a universal record locator (URL) associated with the HTML file, a source name associated with the plurality of sets of encoded data slices, and the DSN IP address 290 for the DSN management server 18. The update DNS table module 274, when operable within the computing device 260, causes the computing device 260 to update the DNS table 280 by one or more of accessing a DSN index of the DSN 282 based on a domain name of the DSN to retrieve a plurality of source names 298 that includes the source name and accessing a slice location table utilizing the source name to retrieve the set of DS unit internet protocol addresses 300. For example, the update DNS table module 274 accesses the DSN index to retrieve the corresponding plurality of source names corresponding to a plurality of files stored in the DSN. Next, the update DNS table module 274 accesses the slice location table utilizing the plurality of source names to retrieve a plurality of sets of DS unit IP addresses that includes the set of DS unit IP addresses 300.

Figure 9C:
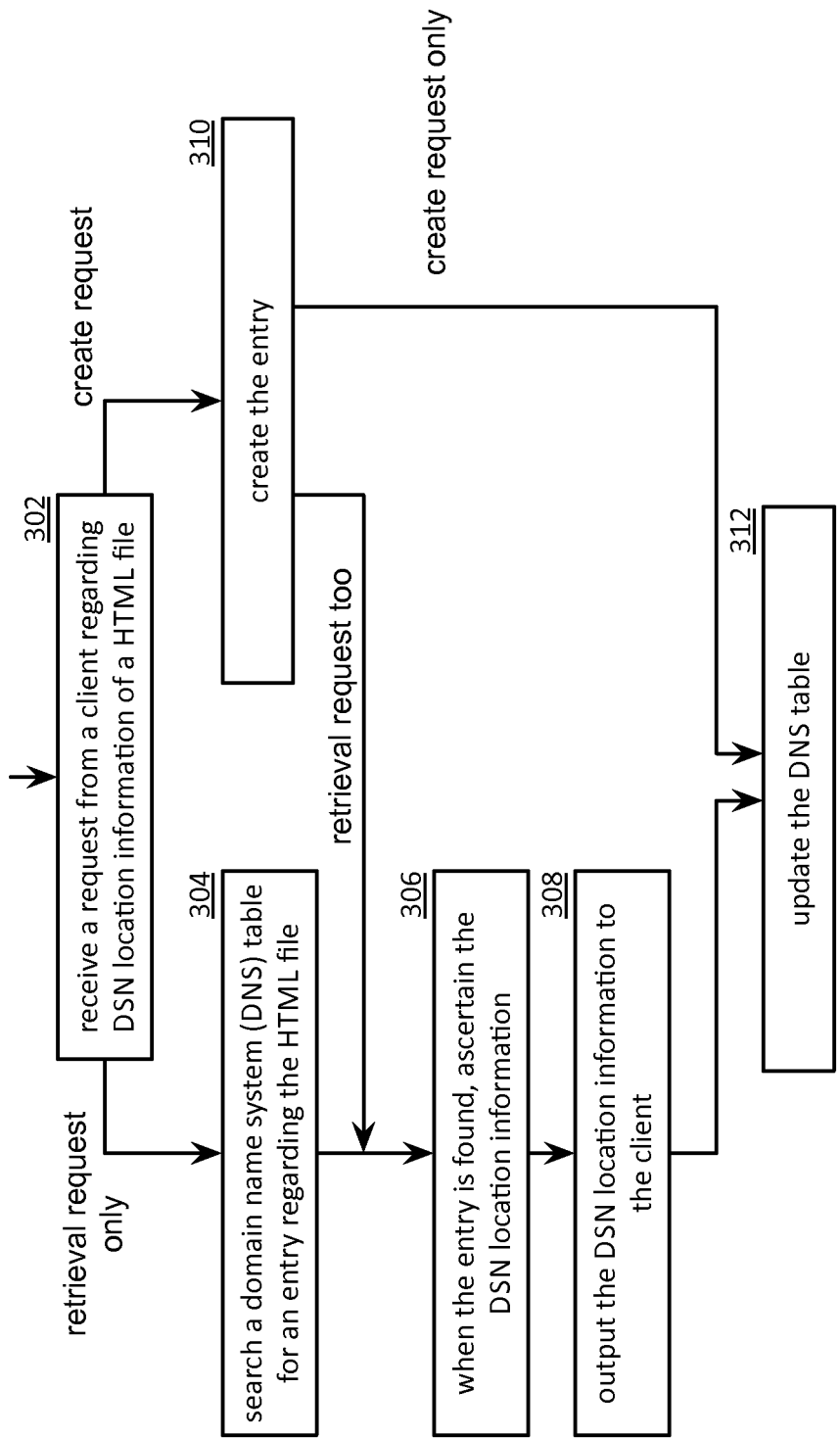
FIG. 9C is a flowchart illustrating an example of providing dispersed storage network location information in accordance with the present invention.

FIG. 9C is a flowchart illustrating an example of providing dispersed storage network location information. The method begins at step 302 where a processing module (e.g., of a computing device, of a server) receives, from a client, a request regarding dispersed storage network (DSN) location information of a hypertext markup language (HTML) file. The DSN location information includes at least one of a set of DS unit internet protocol (IP) addresses, a plurality of sets of slice names associated with the plurality of sets of encoded data slices of the HTML file, an identifier (ID) of a DSN, and a DSN internet protocol (IP) address for a DSN management server. The request includes at least one of a retrieval request and a creation request. The retrieval request includes at least one of the ID of the DSN, a universal record locator (URL) associated with the HTML file, and a source name associated with the plurality of sets of encoded data slices.

The method continues at step 304 where the processing module searches a domain name system (DNS) table for an entry regarding the HTML file based on information of the request. The searching includes searching the DNS table for the entry based on the at least one of the identifier of the DSN, the URL, and the source name when the request is a retrieval request. The searching further includes searching the DNS table for the entry based on the source name when the request is the retrieval request and the request includes the source name.

When the entry is found, the method continues at step 306 where the processing module ascertains the DSN location information regarding the plurality of sets of encoded data slices, wherein the HTML file is encoded using a dispersed storage (DS) error coding function to produce the plurality of sets of encoded data slices and wherein the plurality of sets of encoded data slices is stored in the DSN. The method continues at step 308 where the processing module outputs the DSN location information to the client. The outputting the DSN location information further includes determining whether accessing the HTML file requires authentication and when accessing the HTML file requires authentication, outputting, to the client, the DSN IP address for the DSN management server and when an authentication notice is received (e.g., from the DSN management server, from the client), outputting the DSN location information to the client.

The outputting the DSN location information further includes determining whether accessing the HTML file requires authentication and when accessing the HTML file requires authentication, outputting a DSN authentication request to the DSN management server based on the DSN IP address, receiving, from the DSN management server, a DSN authentication response that includes a signed certificate, and outputting the DSN location information and the signed certificate to the client. Next, the client stores the signed certificate for subsequent retrieval requests for the HTML file.

When the request is a creation request to create the entry in the DNS table, the method continues at step 310 where the processing module creates the entry to include one or more of the ID of the DSN, the universal record locator (URL) associated with the HTML file, the source name associated with the plurality of sets of encoded data slices, and the DSN IP address for the DSN management server. The method may branch back to step 306 to ascertain the DSN location information from the created entry when the request also includes the retrieval request.

The method continues at step 312 where the processing module updates the DNS table. The updating includes one or more of accessing a DSN index of the DSN based on a domain name of the DSN to retrieve a plurality of source names that includes the source name and accessing a slice location table utilizing the source name to retrieve a set of DS unit internet protocol addresses.

Figure 10:
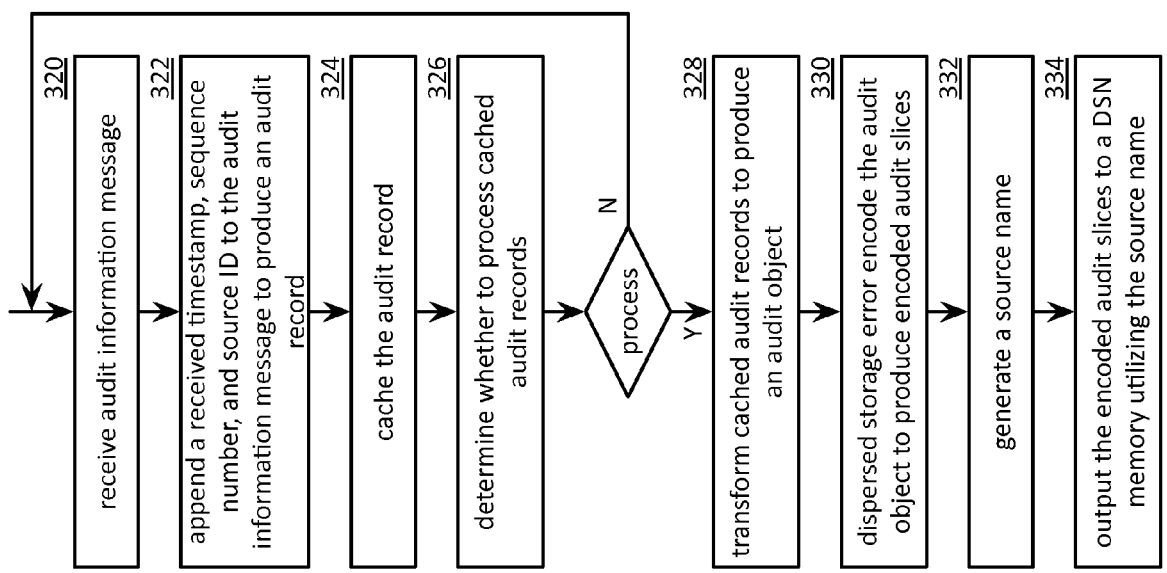
FIG. 10 is a flowchart illustrating an example of generating an audit object in accordance with the present invention.

FIG. 10 is a flowchart illustrating an example of generating an audit object. The method begins at step 320 where a processing module (e.g., of a dispersed storage (DS) managing unit) receives an audit information message. The audit information message indicates prior activity within a dispersed storage network (DSN) and includes one or more of a type code (e.g., read, write, delete, list, etc.), a short message indicator, a long message indicator, a user identifier (ID), an activity timestamp (e.g., a date and time of execution of the activity), an activity indicator, and a source ID. The audit information message may be received from one or more of a user device, a dispersed storage (DS) processing unit, a storage integrity processing unit, a DS managing unit, and a DS unit.

The method continues at step 322 where the processing module appends a received timestamp (e.g., current date and time), a sequence number (e.g., a monotonically and consecutively increasing number), and a source ID (e.g., identifier of machine sending audit information message) to the audit information message to produce an audit record. A structure of the audit record is discussed in greater detail with reference to FIG. 11B. The method continues at step 324 where the processing module caches the audit record in a local memory and/or stores the audit record as encoded audit record slices in a DSN memory. The method continues at step 326 where the processing module determines whether to process cached audit records. The determination may be based on one or more of a number of audit records, size of the audit records, and an elapsed time since a last processing. For example, the processing module determines to process cached audit records when the number of audit records is greater than an audit record threshold. The method repeats back to step 320 when the processing module determines not to process the cached audit records. The method continues to step 328 when the processing module determines to process the cached audit records.

The method continues at step 328 where the processing module transforms two or more cached audit records to produce an audit object. The transforming includes determining a number of audit records of the two or more audit records to include in the audit object to produce a number of audit records entry for a number of records field within the audit object, aggregating the number of audit records into the audit object, generating integrity information, and aggregating the two or more audit records, a number of audit records indicator, and the integrity information into the audit object in accordance with an audit object structure. The audit object structure is discussed in greater detail with reference to FIG. 11A.

The method continues at step 330 where the processing module dispersed storage error encodes the audit object to produce one or more sets of encoded audit slices. The method continues at step 332 where the processing module generates a source name corresponding to the one or more sets of encoded audit slices. For example, the processing module generates the source name based on at least one of an audit vault ID, an aggregator internet protocol (IP) address, and a current timestamp. The method continues at step 334 where the processing module outputs the one more sets of encoded audit slices to a DSN memory utilizing the source name.

FIG. 11A is a diagram illustrating an example of an audit object file structure.

The structure includes an audit object data file 336, wherein the audit object data file 336 may be stored in a dispersed storage network (DSN) as one or more sets of encoded audit slices, and wherein the audit object data file 336 is accessible at a source name DSN address when stored as the one or more sets of encoded audit slices.

The audit object data file 336 includes a number of records field 338, a set of size indicator fields size 1-R, a set of audit record fields 1-R, and an integrity information field 340. The number of records field 338 includes a number of records entry indicating a number of audit records R included in the audit data object file 336. Each such size indicator field includes a size indicator corresponding to an audit record within the set of audit records 1-R. For example, a size 1 field includes a size 1 entry of 300 when a size of an audit record entry of audit record field 1 is 300 bytes. The integrity information field 340 includes an integrity information entry, wherein the integrity information entry includes integrity information corresponding to the audit object data file. The integrity information is described in greater detail with reference to FIG. 11C.

FIG. 11B is a diagram illustrating an example of an audit record file structure. The structure includes an audit record data file 342, wherein the audit record data file 342 may be aggregated into an audit object data file 336 for storage in a dispersed storage network (DSN) as one or more sets of encoded audit slices. The audit record data file 342 includes a sourced timestamp field 344, a received timestamp field 346, an object timestamp field 348, a sequence number field 350, a type code field 352, a source identifier (ID) field 354, a user ID field 356, and a further type information field 358. The sourced timestamp field 344 includes a sourced timestamp entry including a date and time of when a corresponding audit message was generated. The received timestamp field 346 includes a received timestamp entry including a date and time of when a corresponding audit record was generated. The object timestamp field 348 includes a object timestamp entry including a date and time of when a corresponding audit object data file was generated. The sequence number field 350 includes a sequence number entry including a monotonically and consecutively increasing number. The type code field 352 includes a type code entry including a type of DSN activity (e.g., a read indicator, a write indicator, a delete indicator, a valid transaction indicator, an invalid transaction indicator). The source ID field 354 includes a source ID entry indicating an identifier associated with a module or unit (e.g., machine) that sent the corresponding audit information message. The user ID field 356 includes a user ID entry indicating a user ID associated with the audit information message. The further type information field 358 includes a further type information entry including one or more of a function of a type code (e.g., a valid slice name, an invalid user ID, a valid user ID, an invalid slice name, etc.).

FIG. 11C is a diagram illustrating an example of integrity information structure.

The structure includes integrity information 360, wherein the integrity information 360 may be aggregated into an audit object data file 336 for storage in a dispersed storage network (DSN) as one or more sets of encoded audit slices. The integrity information 360 includes an aggregator identifier (ID) field 362, a certificate chain field 364, a signature algorithm field 366, and a signature field 368. The aggregator ID field 362 includes an aggregator ID of a module or unit that generated the corresponding audit object file. The certificate chain field 364 includes a certificate chain entry including one or more signed certificates of a chain structure. The chain structure includes one or more of a signed certificate associated with the aggregator ID, an intermediate signed certificate, and a root signed certificate. The signature algorithm field 366 includes a signature algorithm entry indicating one or more of an encryption algorithm identifier associated with generating a signature, a public key, and a private key. The signature field 368 includes a signature entry indicating a signature over the entire audit object data file in accordance with a signature algorithm of the signature algorithm entry and a public and/or private key associated with the aggregator ID.

Figure 12A:
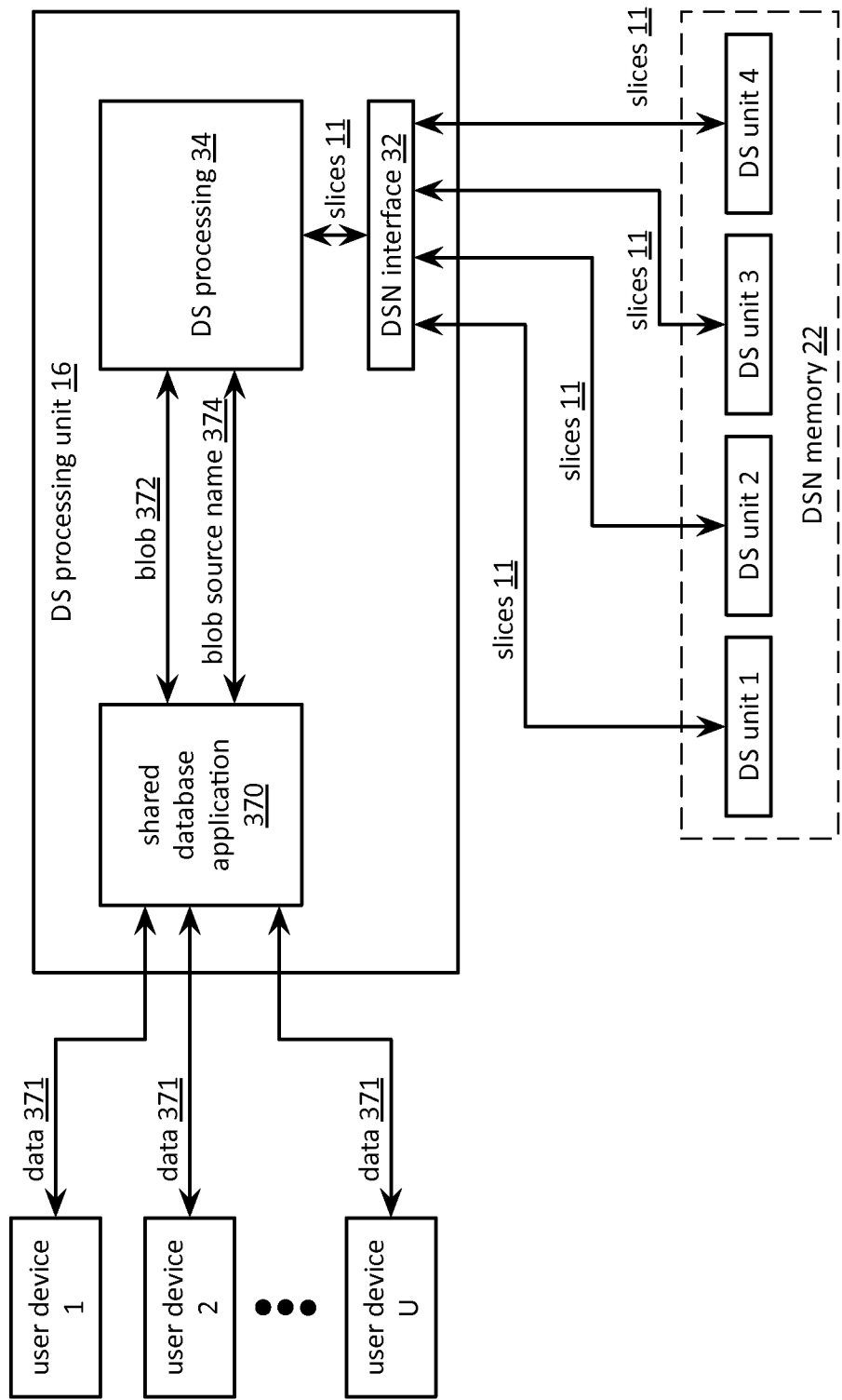
FIG. 12A is a schematic block diagram of another embodiment of a computing system in accordance with the present invention.

FIG. 12A is a schematic block diagram of another embodiment of a computing system that includes a dispersed storage network (DSN) memory 22, a dispersed storage (DS) processing unit 16, and a plurality of user devices 1-U. The DSN memory 22 includes a plurality of DS units 1-4. The DS processing unit 16 includes a DSN interface 32, a DS processing 34, and a shared database application 370. The DS processing 34 may be implemented within the DS processing unit 16, within the shared database application 370, and within a user device 12. The shared database application 370 includes a software application providing database functionality to the plurality of user devices 1-U and may be implemented within the DS processing 34, within the DS processing unit 16, within a user device 12, or within any computing core 26. The shared database application 370 may operate in accordance with one or more industry de facto or de jure standards (e.g., Microsoft SQL 2010). The plurality of user devices 1-U may access shared (e.g., common) database data 371. Each user device of the plurality of user devices 1-U may utilize a database sharing software client to access the shared database application 370. The database sharing software client may operate in accordance with one or more industry de facto or de jure standards (e.g., Sharepoint, Microsoft SQL 2010).

The shared database application 370 utilizes the DS processing 34 to store and retrieve the database in the DSN memory 22. The shared database application 370 generates a database in accordance with a binary large object (blob) format and produce a blob 372 and sends the blob 372 to the DS processing 34 for storage in the DSN memory 22 as slices 11. The shared database application 370 receives a blob source name 374 corresponding to the blob 372 (e.g., a data identifier (ID)) from the DS processing 34 such that the DS processing 34 stores the blob 372 as encoded blob slices 11 in the DSN memory 22 in accordance with the blob source name 374. The shared database application 370 locally saves the data ID and the blob source name 374 to facilitate subsequent retrieval of the blob 372.

In a data storage example of operation, user device 1 sends a data storage request to the shared database application 370 for storage of data 371 in a database. The data storage request includes at least one of the data 371, a user ID, a group ID, and a data ID. The shared database application 370 generates an amended database based on the database and the data 371 in accordance with a database application function. For example, the shared database application generates a new database when the data 371 is associated with new data for a new database. As another example, the shared database application 370 generates a new portion of an existing database when the data 371 is associated with new data for an existing database. As yet another example, the shared database application 370 generates an amended portion of an existing database when the data 371 is associated with modifying data of an existing database. The shared database application performs a lookup to determine the blob source name 374 based on the data ID when the shared database application modifies an existing database. The shared database application 370 retrieves an existing blob utilizing the DS processing 34 when the shared database application 370 modifies an existing database.

The shared database application 370 sends a new blob storage request to the DS processing 34 when the shared database application 370 creates a new database. The new blob storage request includes one or more of the blob 372 and a data ID. The shared database application 370 receives a blob source name of 103 corresponding to a data ID of B57 and locally stores the blob source name and data ID when a new database is created (e.g., a new blob is created). The shared database application 370 sends an existing blob storage request to the DS processing 34 when the shared database application 370 modifies an existing database. The existing blob storage request includes at least one of a modified blob, a data ID, and the blob source name 374.

In a data retrieval example of operation, user device 2 sends a data retrieval request to the shared database application 370, wherein the request includes a data ID. The shared database application 370 determines the blob source name 374 utilizing the data ID in a lookup. The shared database application 370 sends a blob retrieval request to the DS processing 34, wherein the request includes a blob source name 374. The DS processing 34 retrieves a plurality of sets of encoded blob slices 11 from the DSN memory 22 utilizing the blob source name 374. The DS processing 34 dispersed storage error decodes the plurality of sets of the blob slices 11 to reproduce the blob 372. The DS processing 34 sends the blob 372 to the shared database application. The shared database application extracts data 371 from the blob 372 and sends the data 371 to user device 2.

Figure 12B:
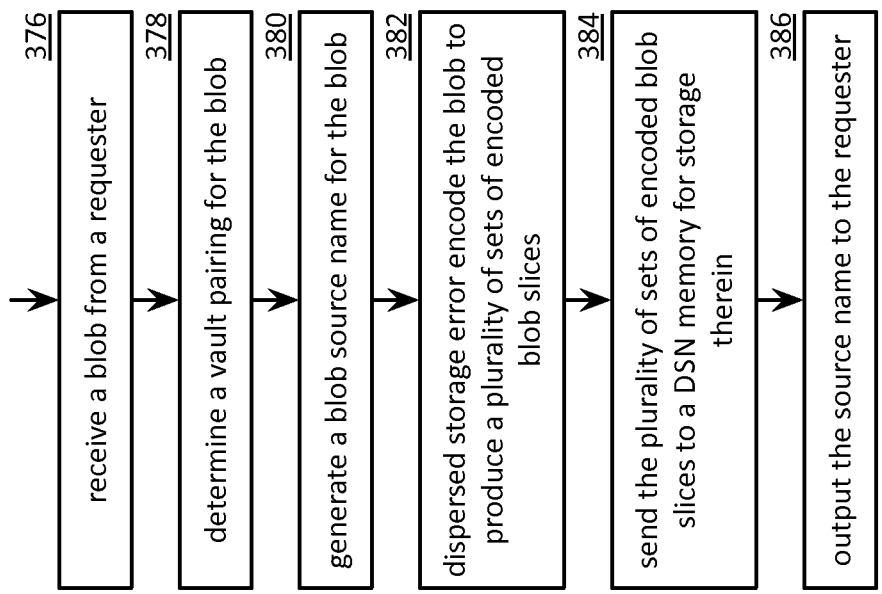
FIG. 12B is a flowchart illustrating an example of storing a binary large object (blob) in accordance with the present invention.

FIG. 12B is a flowchart illustrating an example of storing a binary large object (blob). The method begins at step 376 where a processing module (e.g., of a dispersed storage (DS) processing unit) receives, from a requesting entity, a store binary large object (blob) request. The request may include a blob, a database application identifier (ID), a user ID, a blob source name, a blob size indicator, a priority indicator, a security indicator, and a performance indicator. The requesting entity may include one or more of a database engine, a database application, a database server, user device, and another DS processing unit. The blob source name maybe included when a corresponding blob is already stored within a dispersed storage network (DSN) memory (e.g., a modified blob storage sequence). The blob source name may not be included when a corresponding blob is not already stored within the DSN memory (e.g., a first-time blob storage sequence).

The method continues at step 378 where the processing module determines a vault pairing corresponding to the blob. The vault pairing includes one or more of a vault ID, a source name, a user ID, and a blob ID. The determination may be based on one or more of the user ID, a port ID, a predetermination, a hard coding, an application pairing, a lookup, a message, and a command. For example, the processing module determines a vault pairing including a vault ID of 457 based on a lookup when a user ID of the store blob request is user ID A450.

The method continues at step 380 where the processing module generates a blob source name corresponding to the blob when a source name has not been previously assigned to the blob. For example, the processing module generates a blob source name for the blob when a blob source name was not received with the store blob request. The determination may be based on one or more of the vault ID of the vault pairing, a data ID, a blob ID, the blob, an object number, a lookup, a predetermination, a source name list, and a next source name corresponding to the vault ID. The processing module obtains a blob source name when the source name has been previously assigned to the blob. The obtaining includes one or more of receiving the blob source name within the store blob request, a query, and a lookup.

The method continues at step 382 where the processing module dispersed storage error encodes the blob to produce a plurality of sets of encoded blob slices. The method continues at step 384 where the processing module sends, utilizing the blob source name, the plurality of sets of encoded blob slices to the DSN memory for storage therein. The method continues at step 386 where the processing module outputs the blob source name to the requesting entity. Alternatively, or in addition to, the processing module sends a plurality of sets of slice names, corresponding to the blob source name, to the requesting entity.

In an example retrieval process, the method begins with the step where the processing module receives a blob source name from a requesting entity. The processing module determines (e.g., a table lookup) a DSN location of encoded blob slices based on the blob source name. The processing module retrieves the plurality of sets of encoded blob slices, utilizing the DSN location, from a DSN memory. Next, processing module dispersed storage error decodes the plurality of sets of encoded blob slices to reproduce the blob. Next, the processing module sends the blob to the requesting entity.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device, the method comprises:

when displaying a first web page of a plurality of web pages, detecting selection of a hypertext element of the first web page, wherein each web page of the plurality of web pages includes one or more hypertext elements to produce a plurality of hypertext elements, and wherein one of the plurality of hypertext elements is either unique to a particular web page of the plurality of web pages or is common to two or more web pages of the plurality of web pages;

in response to detecting the selection of the hypertext element, accessing a hypertext elements to distributed storage network (DSN) location information table to determine DSN location information associated with the selected hypertext element of the first web page, wherein the table includes an entry for each hypertext element of the plurality of hypertext elements;

retrieving a plurality of sets of encoded data slices based on the DSN location information;

decoding the plurality of sets of encoded data slices to produce at least a portion of another web page of the plurality of web pages; and displaying the at least a portion of the another web page.

2. The method of claim 1 further comprises at least one of:

decoding, a first set of the plurality of sets of encoded data slices to produce at least a portion of a first element of the at least a portion of the another web page; and decoding, a second set of the plurality of sets of encoded data slices to produce at least a portion of a second element and at least a portion of a third element of the at least a portion of the another web page.

3. The method of claim 1, wherein the determining the DSN location information further comprises at least one of:
- determining slice names for the plurality of sets of encoded data slices and issuing a plurality of requests based on the slice names; and
- determining DS units storing the plurality of sets of encoded data slices and issuing a plurality of requests to the DS units.

4. The method of claim 1, wherein the determining the DSN location information comprises at least one of:
- determining a DSN identifier (ID) that identifies one of a plurality of dispersed storage networks; and
- determining DSN addressing information regarding storage of the plurality of sets of the encoded data slices.

5. The method of claim 1 further comprises:
- caching the at least a portion of the another web page in local cache memory when the selected hypertext element is common to two or more web pages of the plurality of web pages.

6. A dispersed storage (DS) module comprises:
- a first module, when operable within a computing device, causes the computing device to:
  - when displaying a first web page of a plurality of web pages, detect selection of a hypertext element of the first web page, wherein each web page of the plurality of web pages includes one or more hypertext elements to produce a plurality of hypertext elements, and wherein one of the plurality of hypertext elements is either unique to a particular web page of the plurality of web pages or is common to two or more web pages of the plurality of web pages;
- a second module, when operable within the computing device, causes the computing device to:
  - in response to detecting the selection of the hypertext element, accessing a hypertext elements to distributed storage network (DSN) location information table to determine DSN location information associated with the selected hypertext element of the first web page, wherein the table includes an entry for each hypertext element of the plurality of hypertext elements;
- a third module, when operable within the computing device, causes the computing device to:
  - retrieve a plurality of sets of encoded data slices based on the DSN location information;
- a fourth module, when operable within the computing device, causes the computing device to:
  - decode the plurality of sets of encoded data slices to produce at least a portion of another web page of the plurality of web pages; and
- a fifth module, when operable within the computing device, causes the computing device to:
  - display the at least a portion of the another web page.

7. The DS module of claim 6, wherein the fourth module is further operable to:
- decode, a first set of the plurality of sets of encoded data slices to produce at least a portion of a first element of the at least a portion of the another web page; and
- decode, a second set of the plurality of sets of encoded data slices to produce at least a portion of a second element and at least a portion of a third element of the at least a portion of the another web page.

8. The DS module of claim 6, wherein the second module further determines the DSN location information by at least one of:
- determine slice names for the plurality of sets of encoded data slices and issuing a plurality of requests based on the slice names; and
- determine DS units storing the plurality of sets of encoded data slices and issuing a plurality of requests to the DS units.

9. The DS module of claim 6, wherein the second module further determines the DSN location information by at least one of:
- determining a DSN identifier (ID) that identifies one of a plurality of dispersed storage networks; and
- determining DSN addressing information regarding storage of the plurality of sets of encoded data slices.

10. The DS module of claim 6 further comprises:
- a sixth module, when operable within the computing device, causes the computing device to:
- cache the at least a portion of the another web page when the selected hypertext element is common to two or more web pages of the plurality of web pages.

* * * * *